(12) United States Patent
Finnerty et al.

(10) Patent No.: US 11,495,805 B2
(45) Date of Patent: Nov. 8, 2022

(54) CONTAINER FOR REFORMER AND FUEL CELL SYSTEM

(71) Applicant: WATT FUEL CELL CORP., Mt. Pleasant, PA (US)

(72) Inventors: Caine Finnerty, Mount Pleasant, PA (US); Paul Dewald, Scottdale, PA (US); Mathew Isenberg, North Canton, OH (US); William Seil, Greensburg, PA (US); Robert Grogan, Port Washington, NY (US)

(73) Assignee: WATT Fuel Cell Corp., Mount Pleasant, PA (US)

( * ) Notice: Subject to any disclaimer, the term of this patent is extended or adjusted under 35 U.S.C. 154(b) by 131 days.

(21) Appl. No.: 17/267,095

(22) PCT Filed: Aug. 23, 2019

(86) PCT No.: PCT/US2019/047872
§ 371 (c)(1),
(2) Date: Feb. 9, 2021

(87) PCT Pub. No.: WO2020/046740
PCT Pub. Date: Mar. 5, 2020

(65) Prior Publication Data
US 2021/0167404 A1 Jun. 3, 2021

Related U.S. Application Data

(60) Provisional application No. 62/724,983, filed on Aug. 30, 2018.

(51) Int. Cl.
*H01M 8/04* (2016.01)
*H01M 8/04014* (2016.01)
(Continued)

(52) U.S. Cl.
CPC ... *H01M 8/04014* (2013.01); *H01M 8/04701* (2013.01); *H01M 8/0618* (2013.01);
(Continued)

(58) Field of Classification Search
CPC ......... H01M 8/04014; H01M 8/04701; H01M 8/0618; H01M 8/2475
(Continued)

(56) References Cited

U.S. PATENT DOCUMENTS

| 5,401,589 A | 3/1995 | Palmer et al. |
| 6,682,841 B1 | 1/2004 | Armstrong et al. |

(Continued)

FOREIGN PATENT DOCUMENTS

| JP | 4015839 B2 | 11/2007 |
| WO | 2013037031 A1 | 3/2013 |

OTHER PUBLICATIONS

International Search Report and Written Opinion from PCT/US19/047872 dated Dec. 11, 2019.
(Continued)

*Primary Examiner* — James M Erwin
(74) *Attorney, Agent, or Firm* — Dilworth & Barrese, LLP

(57) ABSTRACT

A fuel cell system, with an air flow system includes a first thermal zone, a second thermal zone, an air blower provided between the first and second thermal zones. The first thermal zone is connected to an inlet port of the fuel cell system. The second thermal zone is connected to an outlet port of the fuel cell system. The air blower is configured to draw in air from the first thermal zone and provide the air to the second thermal zone.

31 Claims, 16 Drawing Sheets

(51) Int. Cl.
  *H01M 8/04701* (2016.01)
  *H01M 8/0612* (2016.01)
  *H01M 8/2475* (2016.01)
  *F28D 1/02* (2006.01)

(52) U.S. Cl.
  CPC ........... *H01M 8/2475* (2013.01); *F28D 1/024* (2013.01); *F28F 2250/08* (2013.01); *F28F 2250/102* (2013.01); *H01M 2250/20* (2013.01)

(58) Field of Classification Search
  USPC ........................................................ 429/413
  See application file for complete search history.

(56) References Cited

U.S. PATENT DOCUMENTS

| | | |
|---|---|---|
| 9,627,700 B2 | 4/2017 | Finnerty et al. |
| 9,627,701 B2 | 4/2017 | Finnerty et al. |
| 2006/0127719 A1 | 6/2006 | Brantley et al. |
| 2008/0044695 A1* | 2/2008 | Kaupert ................. C01B 3/386 |
| | | 429/441 |
| 2012/0171584 A1 | 7/2012 | Weingaertner et al. |
| 2016/0079613 A1 | 3/2016 | Gurunathan et al. |
| 2016/0264416 A1* | 9/2016 | Finnerty ................. B01J 4/002 |
| 2017/0062852 A1* | 3/2017 | Finnerty ............. H01M 8/0625 |

OTHER PUBLICATIONS

Extended European Search Report for Application No. 19854165.8 dated Mar. 6, 2022.

* cited by examiner

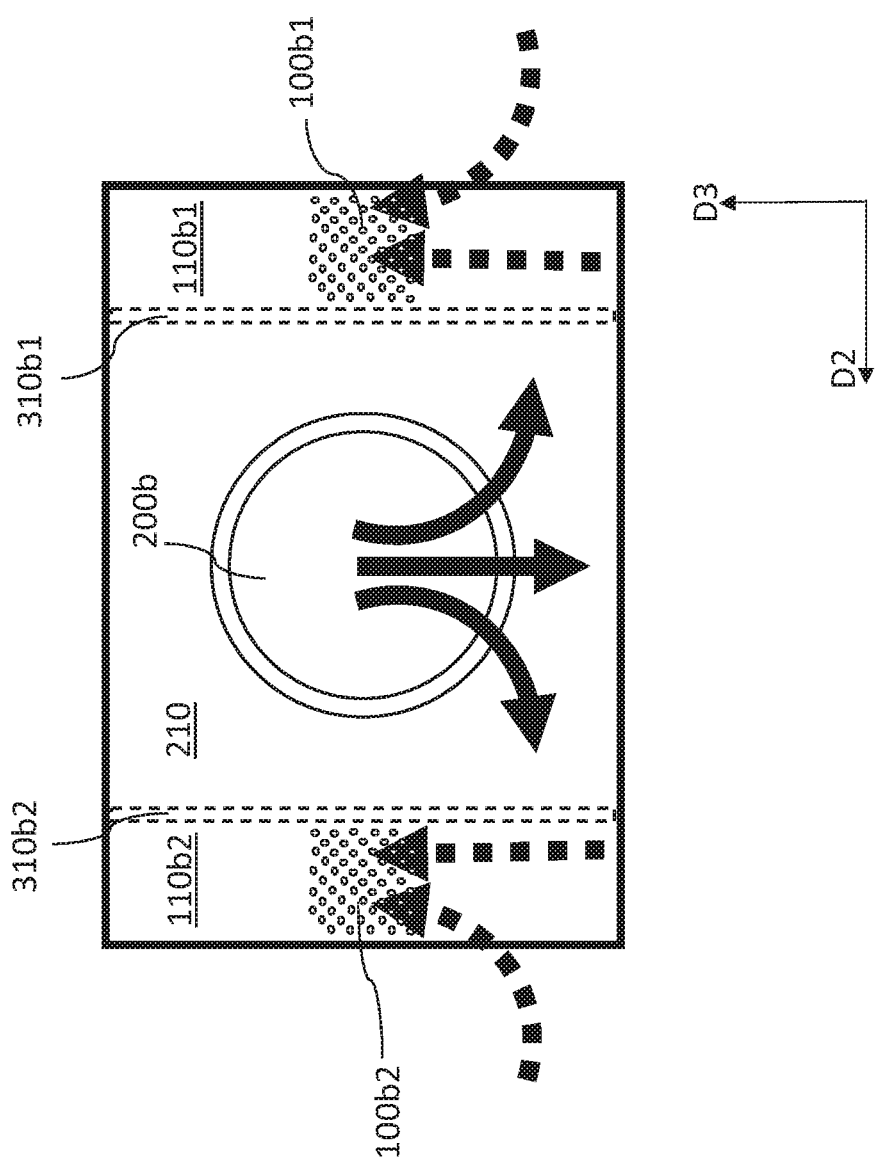

CONTAINER FOR REFORMER AND FUEL CELL SYSTEM

CROSS REFERENCE TO RELATED APPLICATION

This application claims priority to U.S. Provisional Application No. 62/724,983 filed on Aug. 30, 2018, the entire contents of which is incorporated herein by reference.

TECHNICAL FIELD

The present disclosure relates to a fuel cell system having different thermal zones optimized for different types of components, and more particularly to a forced air flow system or method for providing temperature cooling air or dilution air for the fuel cell system.

BACKGROUND

Forced air flow systems have been developed for temperature cooling or fuel dilution in fuel-consuming apparatuses such as fuel cell reformers or fuel cell systems to prevent the apparatuses from malfunctioning or being damaged due to high temperature, or to maintain a desired thermal environment appropriate for intended operations thereof.

Generally, air blowers are used for generating forced air streams. In many cases, the air blowers are located on an exterior wall of a housing thereof to cause an unwanted noise or reduce an air flow efficiency, or locally deployed on or around a particular component within an apparatus. However, there lacks consideration for designs (or design rules) regarding a size, shape, or configuration of an air flowing channel therein, a location of an air blower in the air channel, and/or deployments of components according to their thermal requirements, so cooling or dilution efficiency could not be maximized.

Thus, there is a need for a new air flow system or method for providing an air flow into an apparatus to meet thermal or dilution requirements given various types of components of the apparatus.

SUMMARY

The foregoing as well as other features and advantages of the present disclosure will be more fully understood from the following figures, description, detailed exemplary embodiments, and claims.

According to one aspect of the present disclosure, there is provided a housing box enclosing an apparatus. The housing box includes a first thermal zone, a second thermal zone and an air blower. The first thermal zone is connected to an inlet port provided on a first exterior wall of the housing box. The second thermal zone is connected to an outlet port provided on a second exterior wall of the housing box. The air blower is provided between the first and second thermal zones and is configured to draw in air from the first thermal zone and provide the air to the second thermal zone.

In one embodiment, the second thermal zone is gas-flow isolated from the first thermal zone except through the air blower In one embodiment, a temperature level of the second thermal zone is higher than a temperature level of the first thermal zone when the air blower runs.

In one embodiment, a pressure level of the second thermal zone is higher than a pressure level of the first thermal zone when the air blower runs.

In one embodiment, the inlet port is configured to draw in the air to the first thermal zone from an outside of the apparatus. The outlet port is configured to exhaust the air from the second thermal zone.

In one embodiment, the housing box further includes one or more power electronic components provided in the first thermal zone and one or more fuel-processing components for electric power generation provided in the second thermal zone.

In one embodiment, the apparatus includes a fuel cell system with the one or more fuel-processing components. The one or more fuel-processing components include one or more balance-of-plant (BOP) components configured to supply reformate to a fuel cell stack and the fuel cell stack configured to generate electric power based on the reformate provided from the one or more BOP components.

In one embodiment, the one or more BOP components include at least one of a fuel reformer, a chemical reactor, a gasket, a pump, a sensor, a humidifier, a heat exchanger, and a burner.

In one embodiment, the housing box further includes a flow switch unit configured to: be switched off to shut off running of the apparatus when an air flow amount measured by the flow switch unit does not meet a preset requirement and be switched on to maintain the running of the apparatus when the air flow amount meets the preset requirement.

In one embodiment, the flow switch unit includes at least one of a flapper or a differential pressure switch.

In one embodiment, the housing box further includes separation wall formed of a thermal insulation material between the first and second thermal zones.

In one embodiment, the second thermal zone includes a first sub-zone and a second sub-zone whose temperature level required to be controlled is different from the first-sub zone. The first sub-zone and the second sub-zone are separated through another separation wall formed of a thermal insulation material.

In one embodiment, the apparatus comprises a fuel cell system with the one or more fuel-processing components. The one or more fuel-processing components include one or more BOP components configured to supply reformate to a fuel cell stack and the fuel cell stack configured to generate electric power based on the reformate provided from the one or more BOP components. The fuel cell stack is provided in the first sub-zone, and the BOP components are provided in the second sub-zone.

In one embodiment, the first thermal zone extends in an L-shape from the inlet port to the air blower, and the second thermal zone extends in a straight line from the air blower to the outlet port.

In one embodiment, the inlet port is coupled to an inlet duct extending to an outdoor space through which ambient air is introduced to the first thermal zone.

In one embodiment, the outlet port is coupled to an outlet duct extending to an outdoor space through which the air of the second thermal zone is exhausted.

According to another aspect of the present disclosure, there is provided a method for providing an air flow into an apparatus. The method includes: providing a first thermal zone and a second thermal zone within a housing box of the apparatus; providing an air blower between the first and second thermal zones; providing one or more power electronics components in the first thermal zone; and providing one or more fuel-processing components in the second thermal zone.

In one embodiment, the first thermal zone is connected to an inlet port provided on a first exterior wall of the housing box, and the second thermal zone is connected to an outlet port provided on a second exterior wall of the housing box.

In one embodiment, a temperature level of the second thermal zone is higher than a temperature level of the first thermal zone when the air blower runs.

In one embodiment, a pressure level of the second thermal zone is higher than a pressure level of the first thermal zone when the air blower runs.

In one embodiment, the method further incudes: providing a flow switch unit in the apparatus; shutting off running of the apparatus when air flow amount measured by the flow switch unit does not meet a preset requirement; and maintaining the running of the apparatus when the air flow amount meets the preset requirement.

In one embodiment, the flow switch unit includes at least one of a flapper or a differential pressure switch.

In one embodiment, the method further includes providing a separation wall formed of a thermal insulation material between the first and second thermal zones.

In one embodiment, the method further includes separating the second thermal zone into at least a first sub-zone and a second sub-zone using another separation wall formed of a thermal insulation material. A temperature level of the second sub-zone required to be controlled is different from the first-sub zone.

In one embodiment, the method further incudes: providing a fuel cell stack of the one or more fuel-processing components in the first sub-zone; and providing one or more BOP components of the one or more fuel-processing components in the second sub-zone.

In one embodiment, the providing the first thermal zone includes extending the first thermal zone in an L-shape from the inlet port to the air blower. The providing the second thermal zone includes extending the second thermal zone in a straight line from the air blower to the outlet port.

BRIEF DESCRIPTION OF THE DRAWINGS

It should be understood that the drawings described below are for illustration purposes only. The drawings are not necessarily to scale, with emphasis generally being placed upon illustrating the principles of the present disclosure. The drawings are not intended to limit the scope of the present disclosure in any way. Like numerals generally refer to like parts.

FIG. 2F is a rear view of the layout of FIG. 2E;

DETAILED DESCRIPTION OF THE EMBODIMENTS

Figure 1:
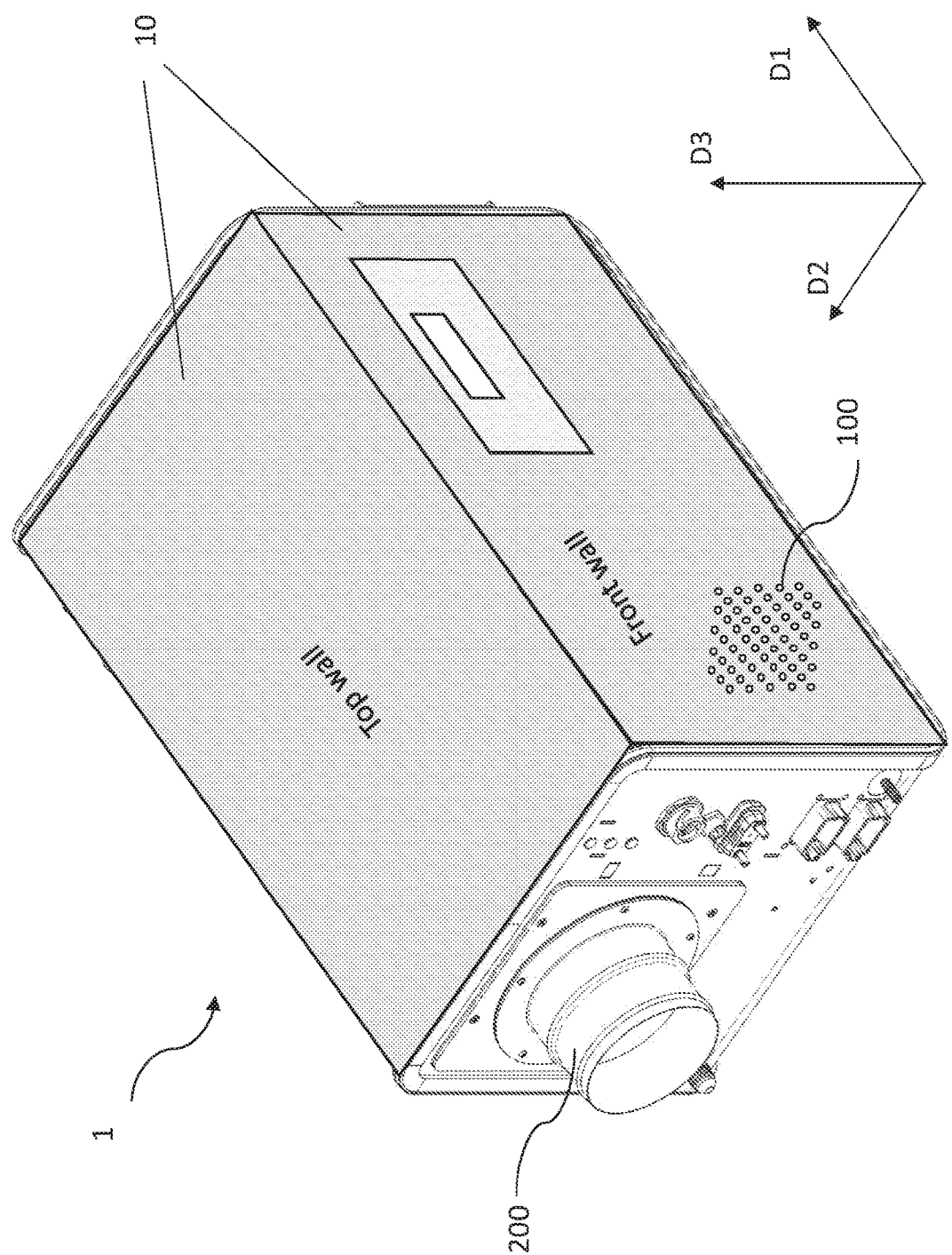
FIG. 1 is a perspective view of an example fuel cell system according to an exemplary embodiment of the present disclosure.

It now has been discovered that an apparatus (e.g., fuel-consuming apparatus) in accordance with present disclosure takes advantages of having a forced air flow system with separated thermal zones so as to adaptively meet different thermal control levels required for various types of elements or components within the apparatus. According to an embodiment of the present disclosure, the thermal zones may be separated by an air blower.

The term "fuel-consuming apparatus" used herein refers to any apparatus operating based on any kinds of fuels, as described in Applicant's U.S. Provisional Application No. 62/724,993 filed on Aug. 30, 2018, the entire disclosure of which is incorporated by reference herein.

By way of examples only, the fuel-consuming apparatus(es) may include, but are not limited to: combustion engines, or all kinds of apparatuses including the combustion engine(s) such as vehicles, electric generators, etc.; and fuel cell reformers or fuel cell systems.

The expression "fuel" shall be understood to include any kinds of liquid fuels and gaseous fuels.

For the sake of description, the present disclosure will be described with reference to a fuel-consuming apparatus (more particularly a fuel cell system) as only an example of the apparatus requiring the forced air flow system, however the scope or exemplary embodiments of the present disclosure are not limited thereto. For example, the scope of the present disclosure can be expanded to any apparatus or a housing box enclosing the apparatus that contains heat generating components with different thermal cooling requirements, so that components (e.g., CPUs) with a relatively high cooling requirement can be placed in a thermal zone (e.g., 210A of FIG. 2A) located after the air blower (e.g., 120 of FIG. 2A) while other components (e.g., I/O, network interfaces) with a relatively low cooling requirement can be placed in another thermal zone (e.g., 110a of FIG. 2A) located before the air blower.

For example, the fuel cell system may include one or more fuel-processing subsystems for the electric power generation such as one or more fuel cell stacks, balance-of-plant (BOP) components and other electronic (or electrical) components for power regulation, communication, and/or the like.

The fuel cell stack includes a plurality of fuel cells. Each fuel cell may generate electricity in the form of direct current (DC) from electro-chemical reactions taking place therein. The individual fuel cells are typically combined in series into a fuel cell stack. The "balance-of-plant (BOP)" used herein may refer to all the supporting components and auxiliary systems of the fuel cell system in order for the fuel cell stack to generate electric power. For example, the BOP components may include, but are not limited to: a fuel reformer, chemical reactors, gaskets, pumps, sensors, humidifier, heat exchangers, burner, blowers, fans, switches, relays, thermistors, thermocouples, reactant conduits, control electronics, and/or the like.

For example, as described in U.S. Pat. Nos. 9,627,700 and 9,627,701, the entire disclosures of which are incorporated by reference herein, the fuel reformer may be configured to supply reformate (e.g., hydrogen-rich reformate) to the fuel cell stack, the fuel cell stack is required to operate in a relatively high thermal environment for maximizing electric power generation. Further, a sufficient amount of air flow is required to be supplied into the fuel cell stack and/or the BOP components, so the air flow can be used for being mixed with fuel to provide, for example, fuel-air mixture(s) and hydrogen-rich reformates, or for the purpose of diluting the fuel to meet safety requirement of the system. In addition, the other electronic components of the fuel cell system may serve as heat generation sources that are required to be cooled down.

That is, there may exist different thermal environments required depending on types or functions of individual components constituting a fuel cell system. In consideration of these requirements, a new and improved forced air flow system is provided for a fuel cell system.

The use of the terms "include," "includes," "including," "have," "has," "having," "contain," "contains," or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

It should be understood that the order of steps or order for performing certain actions is immaterial so long as the present disclosure remain operable. For example, the methods described herein can be performed in any suitable order unless otherwise indicated herein or otherwise clearly contradicted by context. Moreover, two or more steps or actions can be conducted simultaneously.

The use of any and all examples, or exemplary language provided herein, for example, "such as," is intended merely to better illuminate the present disclosure and does not pose a limitation on the scope of the invention unless claimed. No language in the specification should be construed as indicating any non-claimed element as essential to the practice of the present disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "switched on" used herein may refer to an operation that a switch system, a switch unit, a switch, or the like is "closed" to activate an electrical connection between both end nodes thereof, so that electric power can flow through the electrical connection. In addition, the term "switched off" used herein may refer to an operation that the switch system, the switch unit, the switch, or the like is "open" to deactivate an electrical connection between both end nodes thereof, so that electric power cannot flow through the electrical connection. Therefore, throughout the present disclosure, the term "switched on" and "closed" are used interchangeably, and the term "switched off" and "open" are used interchangeably.

Throughout the description, the terms "hot zone" and "cold zone" are used. These terms are relative in nature and can refer to zones wherein different temperature requirements are needed. Thus, a "hot zone" may refer to a zone where heat producing components are contained and require more extensive cooling that other system components. Whereas, a "cold zone" may refer to a zone where components may or may not produce heat and may or may not require cooling, but require less cooling than the components in the "hot zone".

Figure 2A:
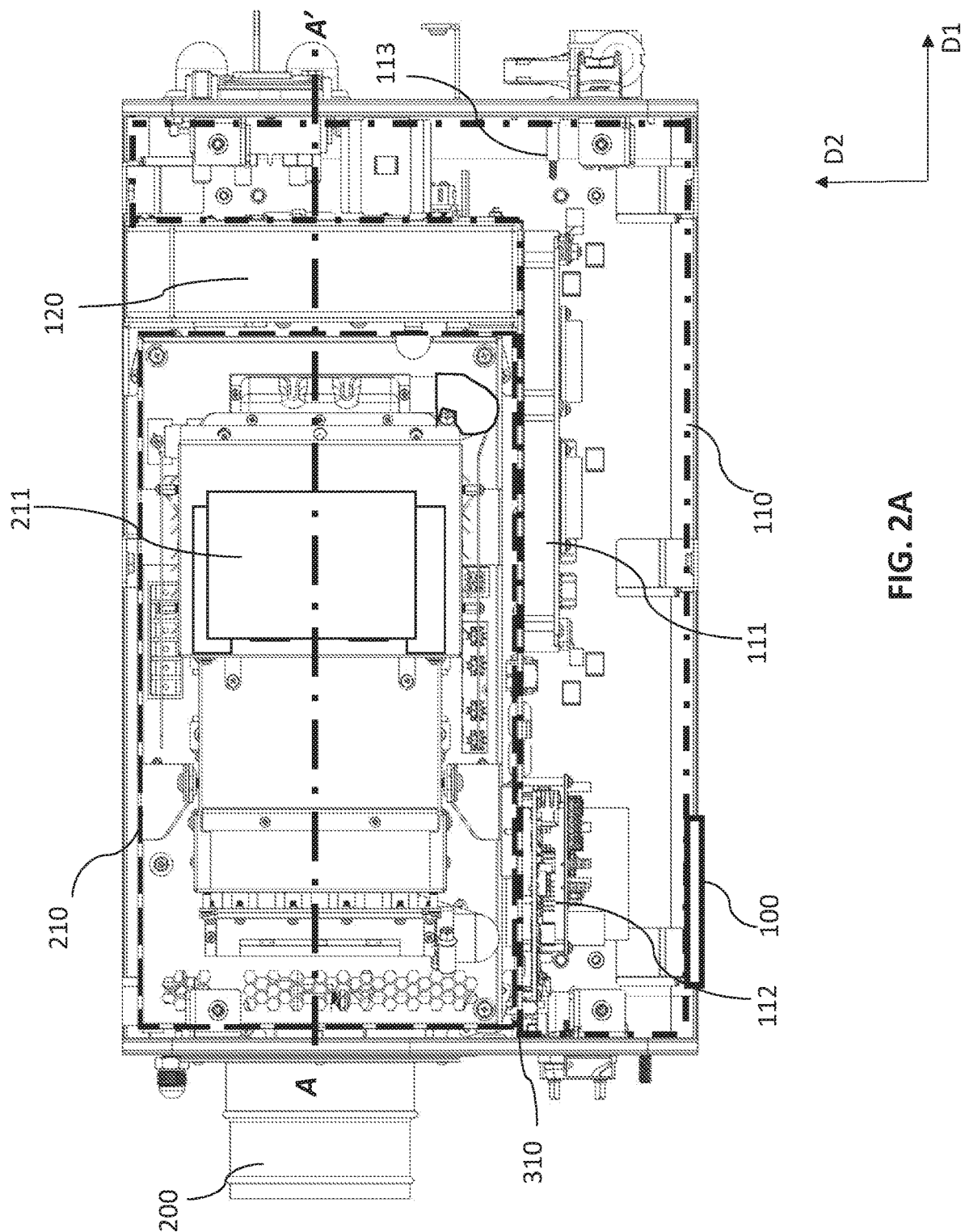
FIG. 2A is a top elevation view of the fuel cell system of FIG. 1.
Figure 2B:
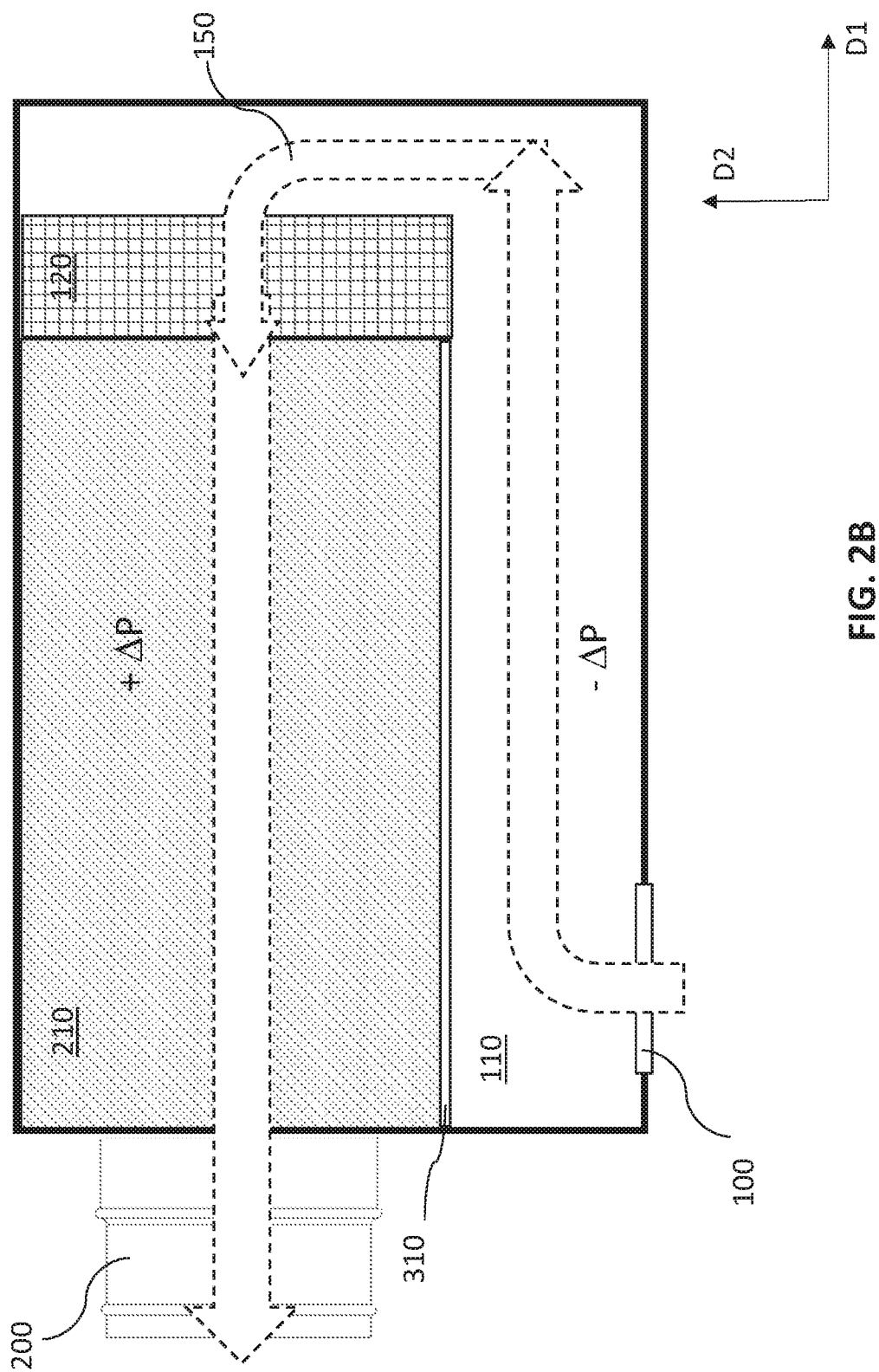
FIG. 2B is a simplified layout of the top elevation view of FIG. 2A which illustrates cold and hot zones in conjunction with an air blower and an air flow channel therethrough.
Figure 2C:
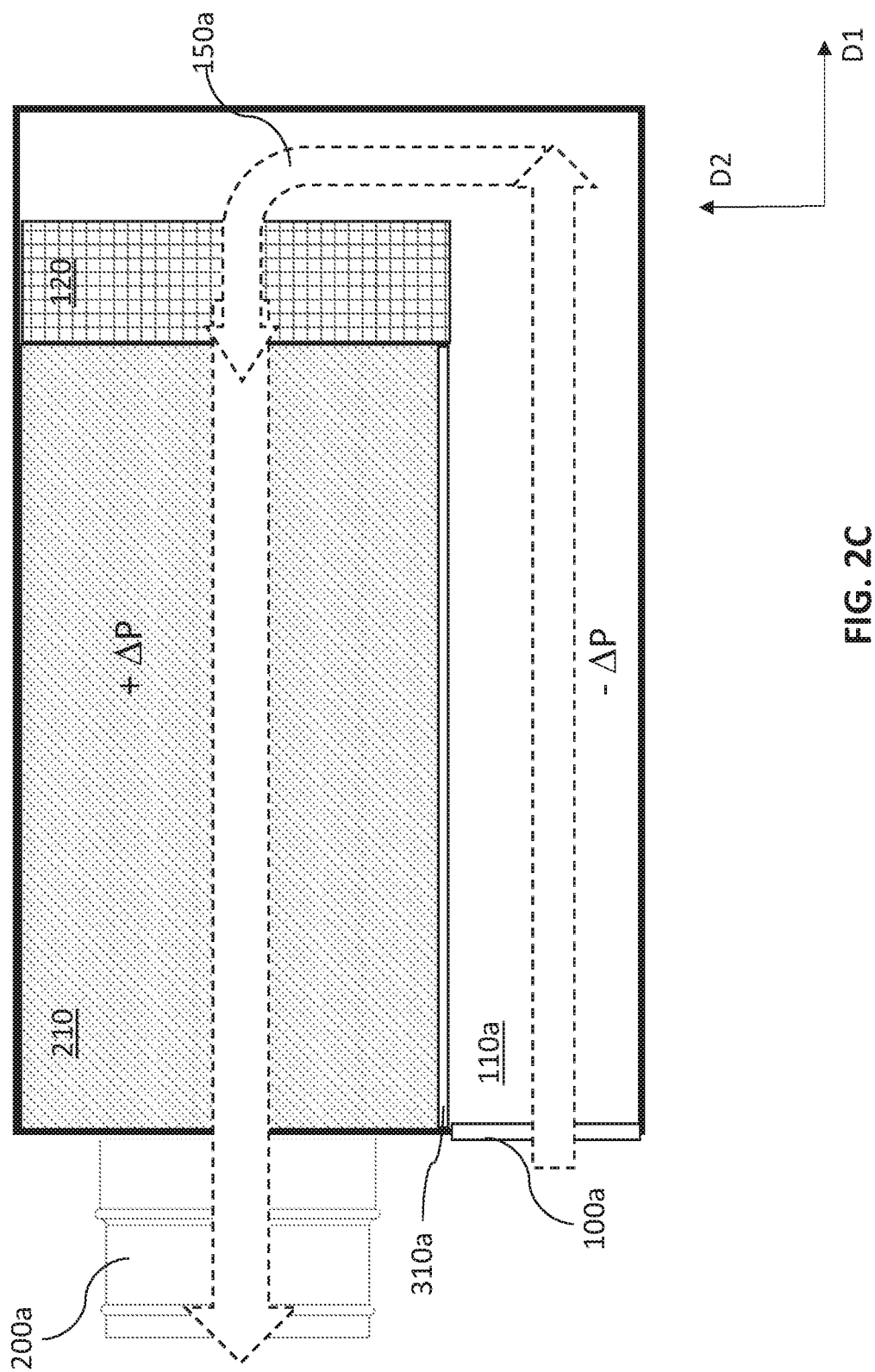
FIG. 2C is a simplified layout of a top elevation view of a fuel cell system, according to an exemplary embodiment of the present disclosure.
Figure 2D:
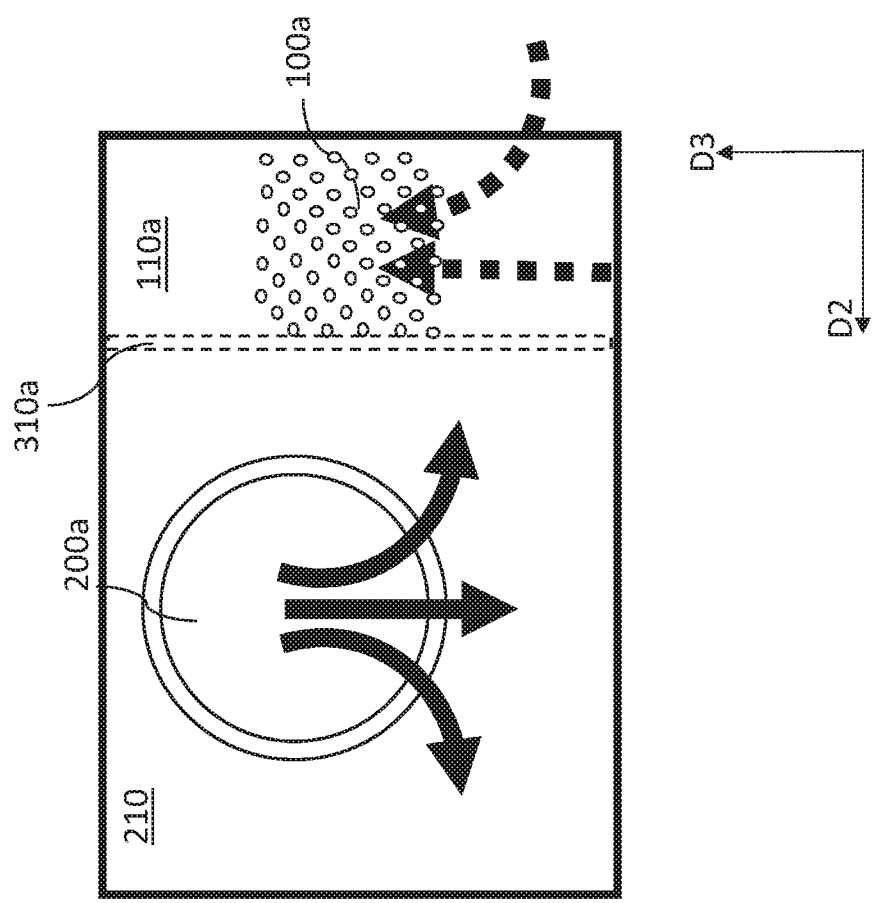
FIG. 2D is a rear view of the layout of FIG. 2C.
Figure 2E:
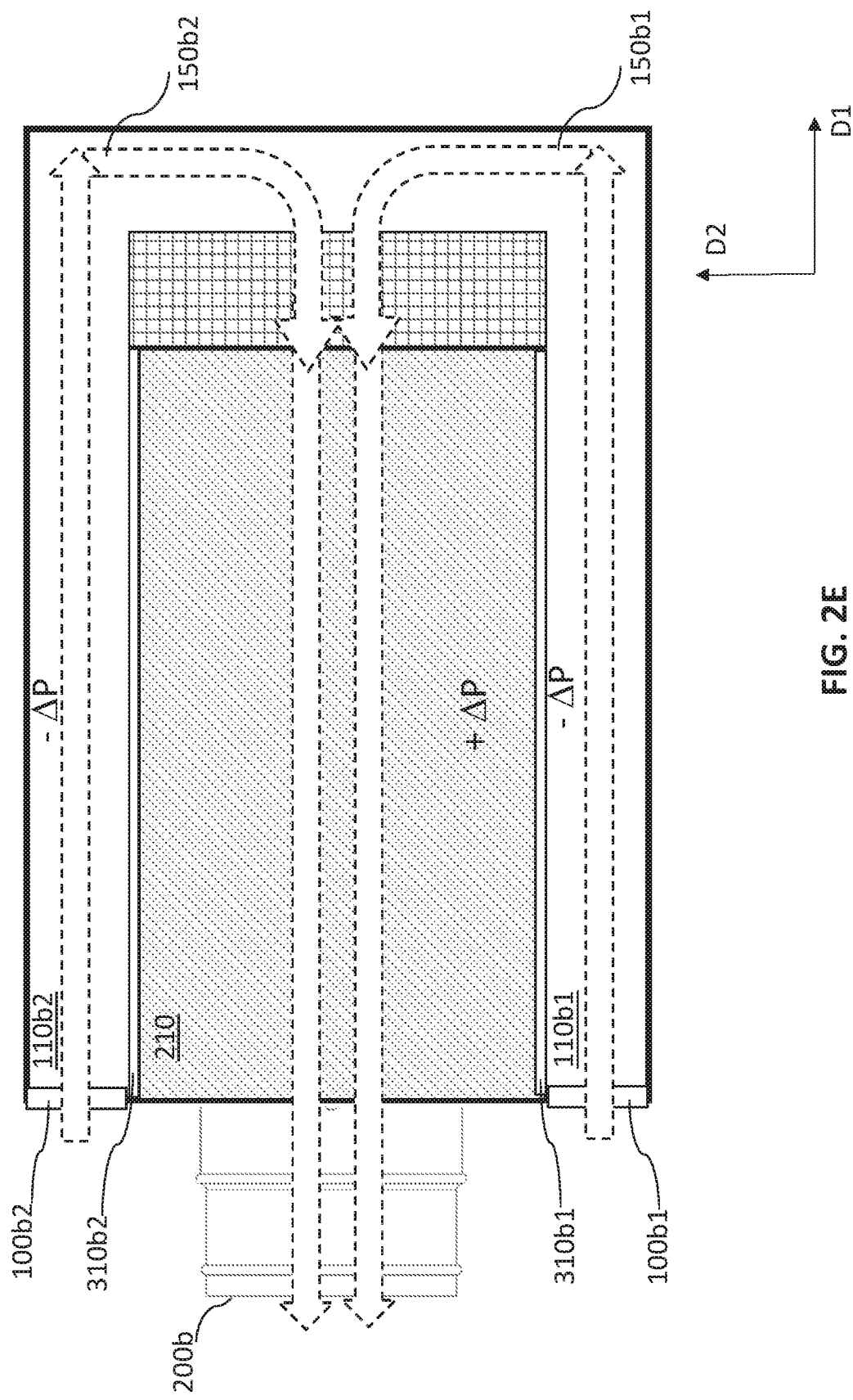
FIG. 2E is a simplified layout of a top elevation view of a fuel cell system, according to an exemplary embodiment of the present disclosure.

FIG. 1 is a perspective view of an example fuel cell system 1 showing exterior walls of a housing box 10 thereof according to an exemplary embodiment of the present disclosure. FIG. 2A is a top elevation view of the fuel cell system of FIG. 1. FIG. 2B is a simplified layout of the top elevation view of FIG. 2A which illustrates cold and hot zones in conjunction with an air blower 120 and an air flow channel 150 therethrough, according to an exemplary embodiment of the present disclosure. FIG. 2C is a simplified layout of a top elevation view of a fuel cell system, according to an exemplary embodiment of the present disclosure. FIG. 2D is a rear view of the layout of FIG. 2C. FIG. 2E is a simplified layout of a top elevation view of a fuel cell system, according to an exemplary embodiment of the present disclosure. FIG. 2F is a rear view of the layout of FIG. 2E.

Referring now to FIG. 1, the fuel cell system 1 is enclosed by six exterior walls of the housing box 10. The housing box 10 may be configured such that all the exterior walls are sealed in pressure, temperature, etc. from the outside except for an inlet port 100 and an outlet port 200. The inlet port 100 may be disposed at one exterior wall (e.g., front wall) and configured to have one or more openings through which the fresh and/or cool air (e.g., ambient air) can be introduced into the housing box 10 of the fuel cell system 1. Similarly, the outlet port 200 may be provided to have one or more openings through which the hot air or gas produced in the hot zone 210 can be exhausted to the outside of the fuel cell system 1.

Referring now to FIGS. 2A and 2B, the fuel cell system 1 may be configured to include an air blower 120 and two thermal zones; a cold zone 110 and a hot zone 210, which are separated through the air blower 120. For example, the air blower 120 may be provided between the cold zone 110 and the hot zone 210, separating the zones 110 and 210. In one embodiment, the air blower 120 may be implemented using an electric fan (e.g., EBM PABST RER 160). Referring particularly to FIG. 2B, when the air blower 120 is driven to run, an air flow channel 150 may be formed along a path from the inlet port 100 to the outlet port 200 via the cold zone 110, the air blower 120, and the hot zone 210 in order. The inlet port 100 and the outlet port 200 may be disposed at both ends of the air flow channel 150.

Referring now to FIG. 2A, the cold zone 110 may correspond to an upstream portion of the air flow channel 150 where electronic components required being cooled are placed. The electronic components may include, but are not limited to: power conversion or regulation components 111, electronics circuits for communications 112, or the like. In the cold zone 110, a fresh or cool air (stream) may be drawn in through the inlet port 100 to create efficient forced convection over the electronic components 111 and 112 to cool down the temperature thereof. As illustrated in FIG. 2B, in one embodiment, the cold zone 110 may extend in directions D1 and D2 to form an L-shape path starting from the inlet port 100 to the air blower 120.

The hot zone 210 may correspond to a downstream portion of the air flow channel 150 where a fuel cell stack 211 and BOP components 212 are placed, so the temperature of the hot zone 210 is relatively high, compared to the cold zone 110, thus hot air or gas would be exhausted through the outlet port 200 of the fuel cell system 1. In one embodiment, the hot zone 210 may straightly extend in an opposite direction to D1 and D2 from the air blower 120 to the outlet port 200. In the figures of the present disclosures, the directions D1, D2 and D3 are perpendicular one to another.

Thus, the overall path of the air flow channel 150 may be U-shaped, as illustrated in FIG. 2B, which allows deployment of all the required components of the fuel cell system (e.g., 1) into a restricted space of the housing box (e.g., 10), providing more design flexibility. However, exemplary embodiments of the present disclosure are not limited thereto, and the air flow channel can adaptively be designed to meet for design requirements such as dimensions or shape of an overall box, etc., and locations and structures of corresponding inlet and output ports may be varied accordingly.

In one embodiment, referring now to FIGS. 2C and 2D, an inlet port 100*a* and an outlet port 200*a* may be disposed at the same rear end of a fuel cell system. More particularly shown in FIG. 2D, the inlet port 100*a* may be disposed besides the outlet port 200*a*, so that air will be drawn in the fuel cell system through the inlet port 100*a* and flown out through the outlet port 200*a* via the air blower 120, forming an air flow channel 150*a*. For example, when the air blower 120 is driven to run, the air flow channel 150*a* may be formed along a path from the inlet port 100*a* to the outlet port 200*a* via the cold zone 110*a*, the air blower 120, and the hot zone 210 in order. The overall path of the air flow channel 150*a* may be U-shaped, as illustrated in FIG. 2C.

In one embodiment, referring to FIGS. 2E and 2F, two inlet ports 100*b*1 and 100*b*2 and an outlet port 200*b* may be disposed at the same rear end of a fuel cell system. More particularly shown in FIG. 2E, the two inlet ports 100*b*1 and 100*b*2 may be disposed at both sides of the outlet port 200*b*, so that air will be drawn in the fuel cell system through two inlet ports 100*b*1 and 100*b*2 and flown out respectively through the outlet port 200*b* via the air blower 120, forming two air flow channels 150*b*1 and 150*b*2, respectively. For example, when the air blower 120 is driven to run, the air flow channel 150*b*1 may be formed along a path from the inlet port 100*b*1 to the outlet port 200*b* via the cold zone 110*b*1, the air blower 120, and the hot zone 210 in order, and further the air flow channel 150*b*2 may be formed along a path from the inlet port 110*b*2 to the outlet port 200*b* via the cold zone 110*b*2, the air blower 120, and the hot zone 210 in order. The overall path of each air flow channel 150*b*1 or 150*b*2 may be U-shaped, as illustrated in FIG. 2E.

Figure 2G:
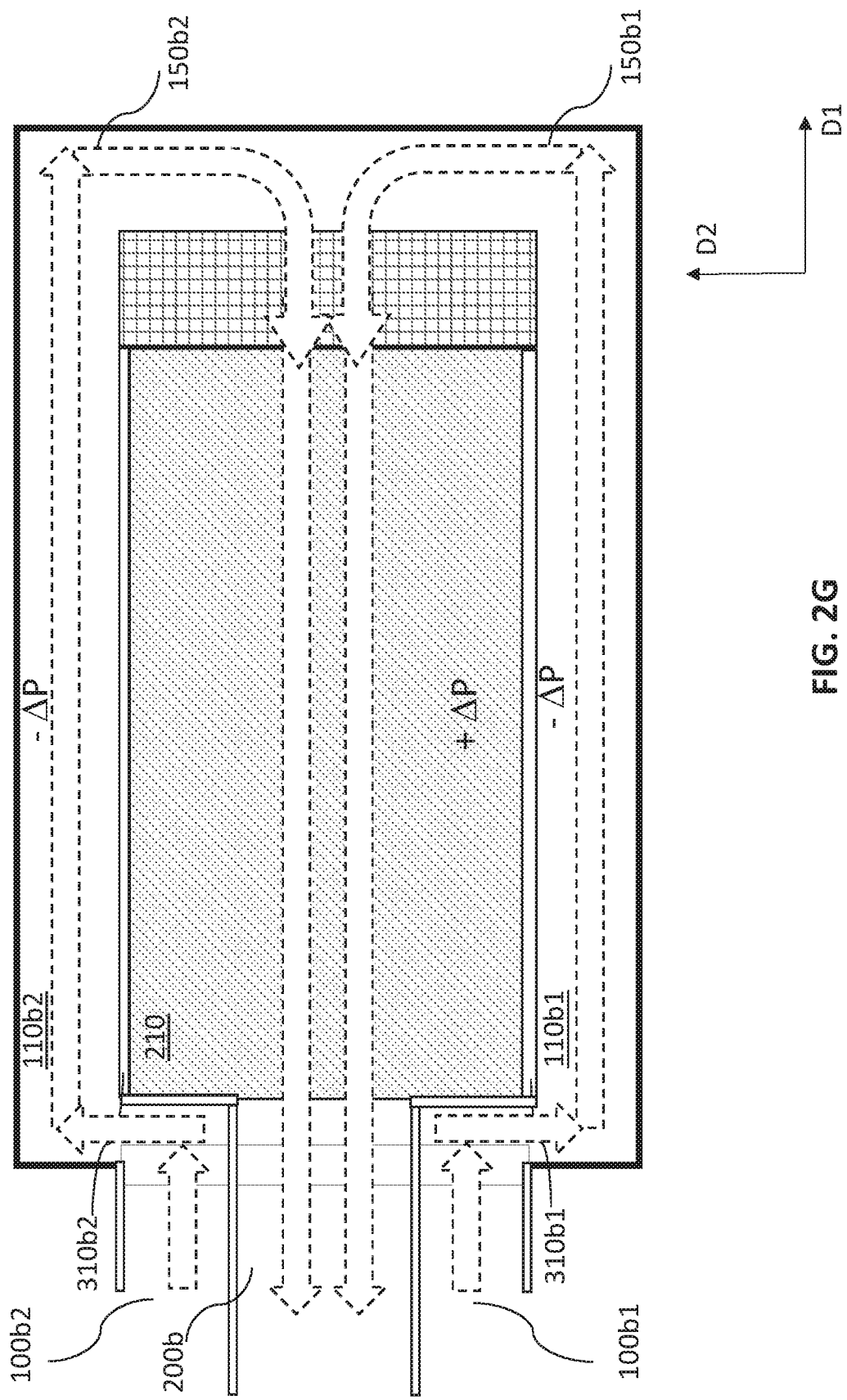
FIG. 2G is a simplified layout of a top elevation view of a fuel cell system, according to an exemplary embodiment of the present disclosure.
Figure 2H:
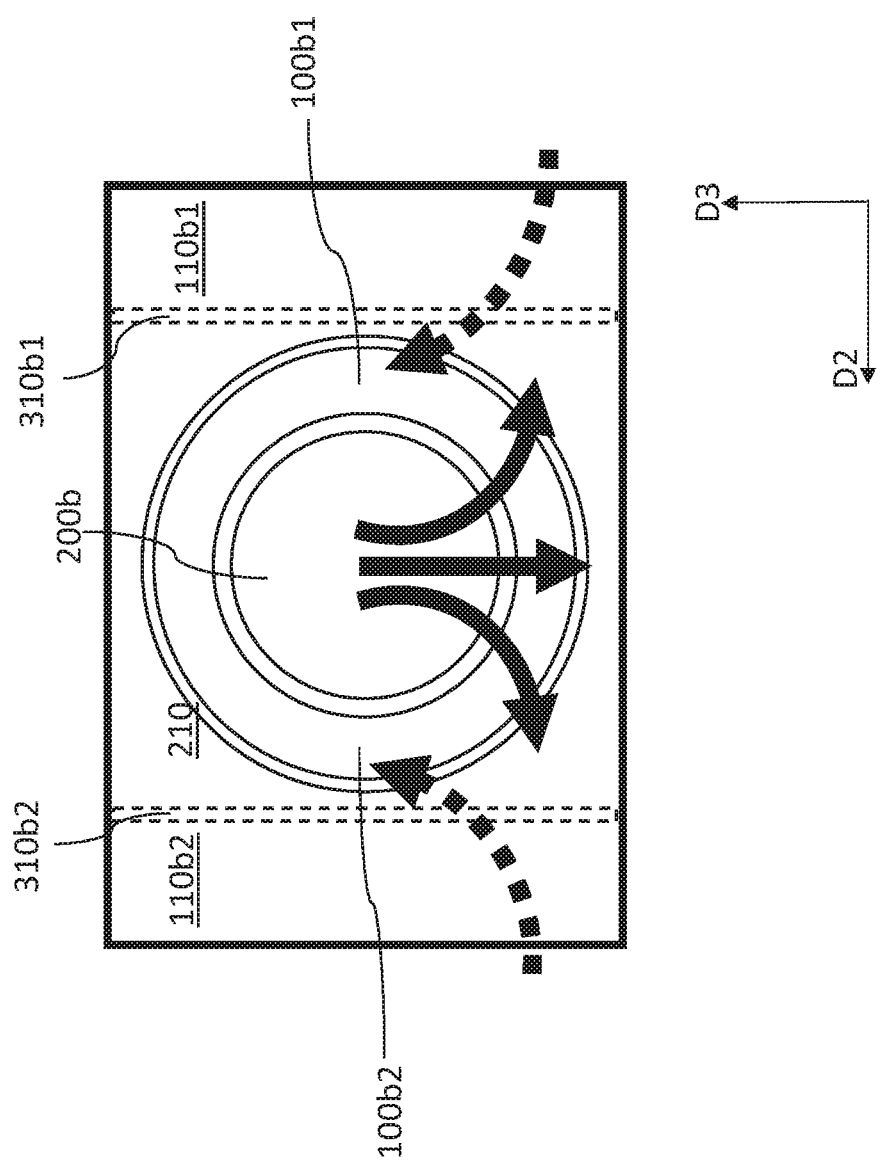
FIG. 2H is a rear view of the layout of FIG. 2G.

In one embodiment, referring to FIGS. 2G and 2H, two inlet ports 100*b*1 and 100*b*2 and an outlet port 200*b* may be disposed at the same rear end of a fuel cell system. More particularly shown in FIG. 2E, the two inlet ports 100*b*1 and 100*b*2 may be disposed at both sides of the outlet port 200*b*, so that air will be drawn in the fuel cell system through two inlet ports 100*b*1 and 100*b*2 and flown out respectively through the outlet port 200*b* via the air blower 120, forming two air flow channels 150*b*1 and 150*b*2, respectively. For example, when the air blower 120 is driven to run, the air flow channel 150*b*1 may be formed along a path from the inlet port 100*b*1 to the outlet port 200*b* via the cold zone 110*b*1, the air blower 120, and the hot zone 210 in order, and further the air flow channel 150*b*2 may be formed along a path from the inlet port 110*b*2 to the outlet port 200*b* via the cold zone 110*b*2, the air blower 120, and the hot zone 210 in order. The overall path of each air flow channel 150*b*1 or 150*b*2 may be U-shaped, as illustrated in FIG. 2G. This configuration will also provide cooling of the exhaust air expelled through outlet port 200*b* as the cooler inlet air intake through inlet ports 100*b*1 and 100*b*2 encircles outlet port 200*b*.

Although it is illustrated in FIGS. 2D and 2F that the overall shape of each inlet port 100*a*, 100*b*1 or 100*b*2 is a quadrilateral centered in the vertical direction D3, exemplary embodiments of the present disclosure are not limited thereto. For example, the overall shape of each inlet port can be a circle or any kind of polygon, and/or the inlet port 100*a*, 100*b*1 or 100*b*2 can be extended to cover the whole area of the cold zone 110*a*, 110*b*1 or 110*b*2 for ensuring more efficient inhale operation; see for example, FIG. 2H.

Referring now to FIGS. 2A to 2H, in one embodiment, the inlet port 100, 100*a*, 100*b*1 or 100*b*2 and the outlet port 200, 200*a* or 200*b* may be configured to be terminated without being coupled to further ventilation components such as ducts, as illustrated in FIG. 1. However, in some environments where the fuel cell system is installed in an indoor space or an enclosure that has a limited ventilation, the inlet port 100, 100*a*, 100*b*1 or 100*b*2 and/or the outlet port 200, 200*a* or 200*b* may further be coupled to a corresponding duct (not shown) to enhance the air ventilation through the air flow channel. For example, the inlet port 100, 100*a*, 100*b*1 or 100*b*2 may further be coupled to an inlet duct (not shown) extending to the outdoor space or any other spaces, so that the fresh or cool air can be introduced from the outdoor space. Although it is illustrated in FIG. 1 that the inlet port (e.g., 100) has a plurality of small openings arranged on the front wall of the fuel cell system 1 without any coupling supporting components to the inlet duct, the size, shape, location and/or configuration of the inlet port according to the present disclosure are not limited thereto. Further, the outlet port 200, 200*a* or 200*b* may further be coupled to an outlet duct (not shown) extending to the outdoor space for more efficient exhaust of the hot air or gas therethrough. All the ventilation-related components including the inlet port 100, 100*a*, 100*b*1 or 100*b*2, the inlet duct, the outlet port 200, 200*a* or 200*b* and the outlet duct may fully be sealed to prevent the exhaust/effluent from entering back to the indoor/enclosure space or the housing box of the fuel cell system.

As described above, the cold zone 110, 110a, 110b1 or 110b2 may be where the electronic (or electrical) components are placed for being cooled down due to cool or fresh air drawn in through the inlet port 100, 100a, 100b1 or 100b2. The electronic (or electrical) components may include: power electronics 111 for dealing with, e.g., power regulation and power inversion of electricity generated from the fuel cell stack 211; and other communication electronic components 212. For example, the power electronics 111 may include a power inverter, a power converter, a battery, or the like.

In addition, the hot zone 210 may be where the fuel cell stack 211 and the BOP components 212 are placed. The air blower 120 may be located between the cold zone 110, 110a, 110b1 or 110b2 and the hot zone 210, separating the cold zone 110, 110a, 110b1 or 110b2 and hot zones 210. The air blower 120 is configured to draw in an air stream passing through the cold zone 110, 110a, 110b1 or 110b2 and blow the air toward the hot zone 210.

In an example embodiment with reference to FIGS. 2A to 2F, the cold zone 110, 110a, 110b1 or 110b2 and the hot zone 210 are separated through the air blower 120 and a separation wall 310, 310a, 310b1 or 310b2 such that the hot zone 210 is gas (or air)-flow isolated from the cold zone 110, 110a, 110bi or 110b2 except through the air blower 120; for example, there is no gas or air communication between the cold zone 110, 110a, 110b1 or 110b2 and hot zone 210 except through the air blower 120.

In addition, the housing box (e.g., 10) of the fuel cell system may be designed for gas (or air) isolation from the outside except through the inlet port 100, 100a, 100b1 or 100b2 and the outlet port 200, 200a or 200b. The separation wall 310, 310a, 310b1 or 310b2 may extend in the direction D1 from the left side wall where the outlet port 200, 200a or 200b is formed to the air blower 120. The separation wall 310, 310a, 310b1 or 310b2 may be formed of a thermal insulation material to prevent a heat transfer between the hot zone 210 and the cold zone 110, 110a, 110b1 or 110b2. Thus, referring still to FIGS. 2A to 2F, the separation through the air blower 120 and the separation wall 310, 310a, 310b1 or 310b2 may cause a pressure difference between the two zones 110, 110a, 110b1 or 110b2 and 210 to enhance the thermal separation therebetween and thus to allow independent thermal control for each thermal zone.

Preferably, the cold zone 110, 110a, 110b1 or 110b2 and the hot zone 210 are pressure-sealed from each other, so that when the air blower 120 is running, a pressure of the hot zone 210 may be higher than a pressure of the cold zone 110, 110a, 110b1 or 110b2. For example, as the air blower 120 runs, the pressure of the hot zone 210 may get higher (e.g., positive differential pressure +ΔP) and the pressure of the cold zone 110, 110a, 110b1 or 110b2 may get lower (e.g., negative differential pressure −ΔP). By way example only, a desired pressure difference between the cold zone 110, 110a, 110b1 or 110b2 and the hot zone 210 may be 0.22~0.3 in WC. More particularly, such relatively high pressure of the hot zone 210 may ease the exhaust of the hot air or gas produced in the hot zone 210 to the outside through the outlet port 200, 200a or 200b.

Similar to a blower described in the U.S. Pat. Nos. 9,627,700 and 9,627,701, the air blower 120 in accordance with the present disclosure may introduce an air or oxygen-containing gas into a conduit of a fuel reformer (not shown) or any other similar functioning components or elements that require the air feeding for being mixed with fuel to provide fuel-air mixture(s) and hydrogen-rich reformates, by using various heaters, vaporizers, igniters, reaction units, etc. of the fuel reformer. The air or oxygen-containing gas can be used for diluting the fuel to meet safety requirement of the system.

The air blower 120 may help the hydrogen-rich reformates move to the fuel cell stack 211. The fuel cell stack 211 includes a plurality of fuel cells. The amount of electrical power or energy efficiency by a fuel cell stack may depend on several factors such as fuel cell type, cell size, temperature at which it operates (e.g., operating temperature), and a pressure of gas supplied to the cell. For example, it is known that the energy efficiency of a fuel cell is generally between 40%-60%, however, if waste heat is captured in a cogeneration scheme, efficiencies can be up 85% at an operating temperature ranging between 800° C. to 1200° C.

Referring now to FIGS. 2A to 2H, deploying of the air blower 120 between the cold zone 110, 110a, 110b1 or 110b2 and the hot zone 210 provides several technical advantages as follows. First of all, since the air blower 120 is located the upstream of the hot zone 210 where the air or gas of high temperature are produced from the BOP components 212 and/or the fuel cell stack 212, no hot air or gas will flow backward from the hot zone 210 to the air blower 120, thus preventing the air blower 120 from being damaged due to such hot air or gas from the hot zone 210, which could result in reduction of motor life time or premature failure in function thereof. Further, since the air blower 120 located between the cold zone 110, 110a, 110b1 or 110b2 and the hot zone 210 can prevent the hot air or gas of the hot zone 210 from flowing backward to the cold zone 110, 110a, 110b1 or 110b2, so the temperature of the cold zone 110, 110a, 110b1 or 110b2 will not be affected by the high temperature of the hot zone 210 to ease the temperature cooling for the cold zone. In addition, since the air blower 120 is located inside the housing box (e.g., 10), a noise level generated from the air blower 120 can be reduced accordingly.

In one embodiment, one or more safety sensors and/or switches may be provided in the air flow channel 150, 150a, 150b1 or 150b2, preferably in the vicinity of the air blower 120 of the cold zone 110, 110a, 110b1 or 110b2, the hot zone 210 and/or both thereof. By way of example only, as illustrated in FIG. 2A, a flow switch unit 113 can be provided in the vicinity of the air blower 120 in the cold zone 110. The Applicant's U.S. Provisional Application No. 62/724,993 filed on Aug. 30, 2018 describes a safety control switching assembly connected between a power source node and a fuel safety shutoff valve. In one embodiment of the present disclosure, the safety control switching assembly includes a serially connected switch units, each of which is switched on or off based on a corresponding safety-related environmental condition. For example, upon at least one of the switch units (e.g., 113 of FIG. 2A) being switched off, the safety control switching assembly may be switched off to cut off power supply into a fuel safety shutoff valve to block fuel supply into a fuel-consuming apparatus for safety operation. The flow switch unit 113 exemplary shown in FIG. 2A may be used as one of the switch units incorporated in the safety control switching assembly. The flow switch unit 113 may be switched on or off based on whether a sufficient amount of air flows into the hot zone 210. For example, upon detection of the air amount being less than a preset level, the flow switch unit 113 may be switched off to shut off the fuel safety shutoff valve (e.g., 217 of FIGS. 5A and 5B) or any other safety-related components of the fuel cell system 1 to ensure the safety operation. If the air amount is equal to or more than the preset level, the flow switch unit 113 may be switched on to let the fuel cell system 1 work without being interrupted, keeping the fuel supplied to the fuel cell system 1.

Figure 3B:
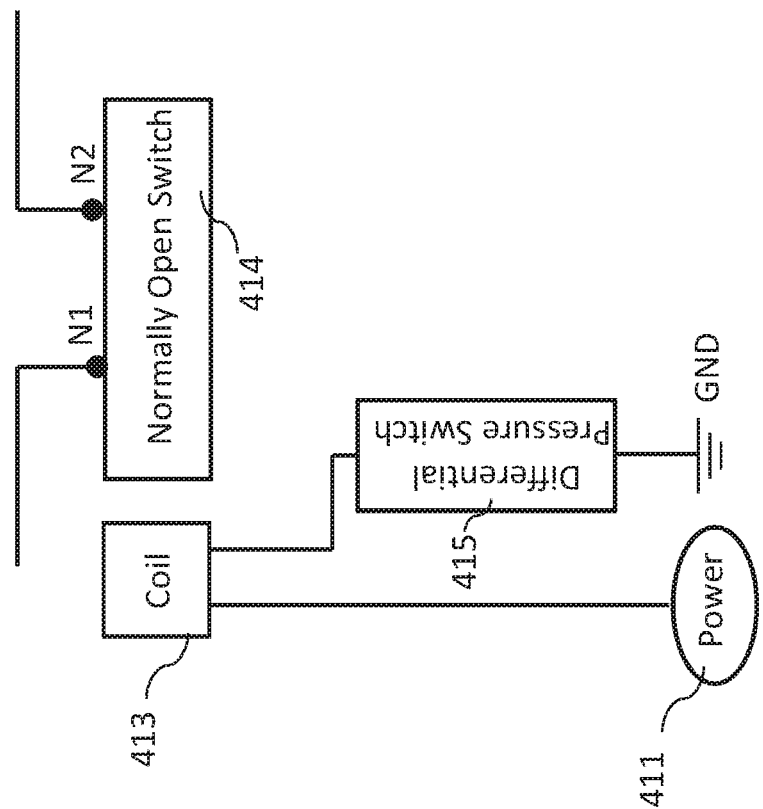
FIG. 3B is a block diagram of an example flow switch unit implemented using a differential pressure switch according to an exemplary embodiment of the present disclosure.
Figure 3A:
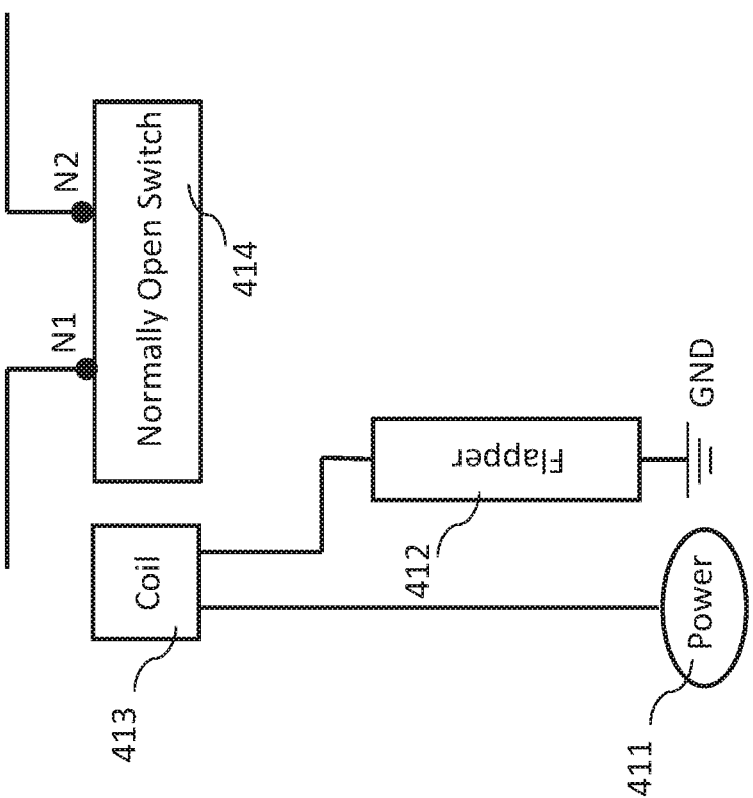
FIG. 3A is a block diagram of an example flow switch unit implemented using a flapper according to an exemplary embodiment of the present disclosure.

Referring now to FIG. 3A illustrating a block diagram of an example flow switch unit 113*a*, the flow switch unit 113*a* can be implemented using a flap-type flow meter 411 (referred to as a "flapper") that measures an air amount (or air flow velocity) flowing into the air blower 120.

By way of examples only, the flapper 412 may be disposed between a relay coil 413 and a normally open switch 414. The relay coil 413 has one terminal node connected directly or indirectly to a power source 411 and another terminal node connected to a ground GND through the flapper 412. The normally open switch 414 is a mechanical switch that remains open normally, and turns to be switched on (e.g., closed) upon electric current flowing through the relay coil 413, so as to engage a connection between terminal nodes N1 and N2 to power the fuel safety shutoff valve 217.

If the air flow amount where the flapper 412 is located is equal to or more than a preset air flow amount threshold, the flapper 412 is configured to snap one termind node to another, so as to switch on an electrical connection between the both terminal end nodes thereof. In addition, if the air flow amount is less than the preset air flow amount threshold, the flapper 412 is configured to be switched off the electrical connection between the terminal end nodes.

For example, upon the flapper 412 being switched on, electric current flows through both terminal nodes of the relay coil 413 to generate magnetic field therearound and force the normally open switch 414 to be closed, so the whole flow switch unit 113*a* will be switched on. If the flapper 412 is open, no current flows through the relay coil 413 and thus the normally open switch 414 will remain open.

Alternatively, instead of having the configuration with the relay coil 413 and the normally open switch 414 as illustrated in FIG. 3A, the flapper 412 itself may be located between the terminal nodes N1 and N2 to control the operation of the fuel safety shutoff valve 217.

Referring now to FIG. 3B illustrating a block diagram of an example flow switch unit 113*b*, the flow switch unit 113*b* can be implemented using a differential pressure switch 415. The differential pressure switch 415 may optionally be disposed at substantially the same as or in the vicinity of the flapper 412. The differential pressure switch 415 may be implemented using one or more sensors measuring a difference in pressure between the cold zone (e.g., 110, 110*a*, 110*bi* or 110*b*2) and the hot zone (e.g., 210). As described above, when the air blower 120 runs, there takes place a differential pressure between the two zones (e.g., 110, 110*a*, 110*b*1 or 110*b*2 and 210). It will be appreciated that the better the air flows, the greater the differential pressure between the cold and hot zones, or vice versa, thus the differential pressure measured by the differential pressure switch 415 can be an index as to how well the air flows along with the air flow channel (e.g., 150, 150*a*, 150*b*1 or 150*b*2). Thus, the differential pressure switch 415 can be configured to be switched off upon the differential pressure between the cold and hot zones being less than a preset differential pressure threshold, and otherwise, the switch 415 is switched on. In one aspect, the differential pressure switch 415 can be incorporated into the switch unit 113*b*, as illustrated in FIG. 3B, the configuration and operations of which are substantially the same as or approximate to those of FIG. 3A except for the differential pressure switch 415 being employed instead of the flapper 412. Thus, duplicate descriptions thereof will be omitted for the sake of simplicity.

In addition, instead of having the configuration with the relay coil 413 and the normally open switch 414 as illustrated in FIG. 3B, the differential pressure switch 415 itself may be located between the terminal nodes N1 and N2 to control the operation of the fuel safety shutoff valve 217.

Still in one embodiment, one or more sensors (not shown) for measuring air flow amount (e.g., air flow rate or air flow velocity) can additionally be placed at locations of interest or can be placed rather the flapper 412 and/or the differential pressure switch 415. In this case, the sensors may send measured results regarding the air flow amount to a controller (not shown) including one or more processors, and the controller may control operations of the fuel safety shutoff valve to instruct whether to shut off supply of the fuel or not, based on the results provided from the sensors, as described in the U.S. Pat. Nos. 9,627,700 and 9,627,701.

In one example scenario, any one of the flapper 412, the differential pressure switch 415 or sensors in conjunction with a controller, and/or combination thereof may be employed to identify whether there are issues (e.g., a clog in the inlet duct) that block the air flow through the inlet duct and/or the air flow channel (e.g., 150).

Figure 4:
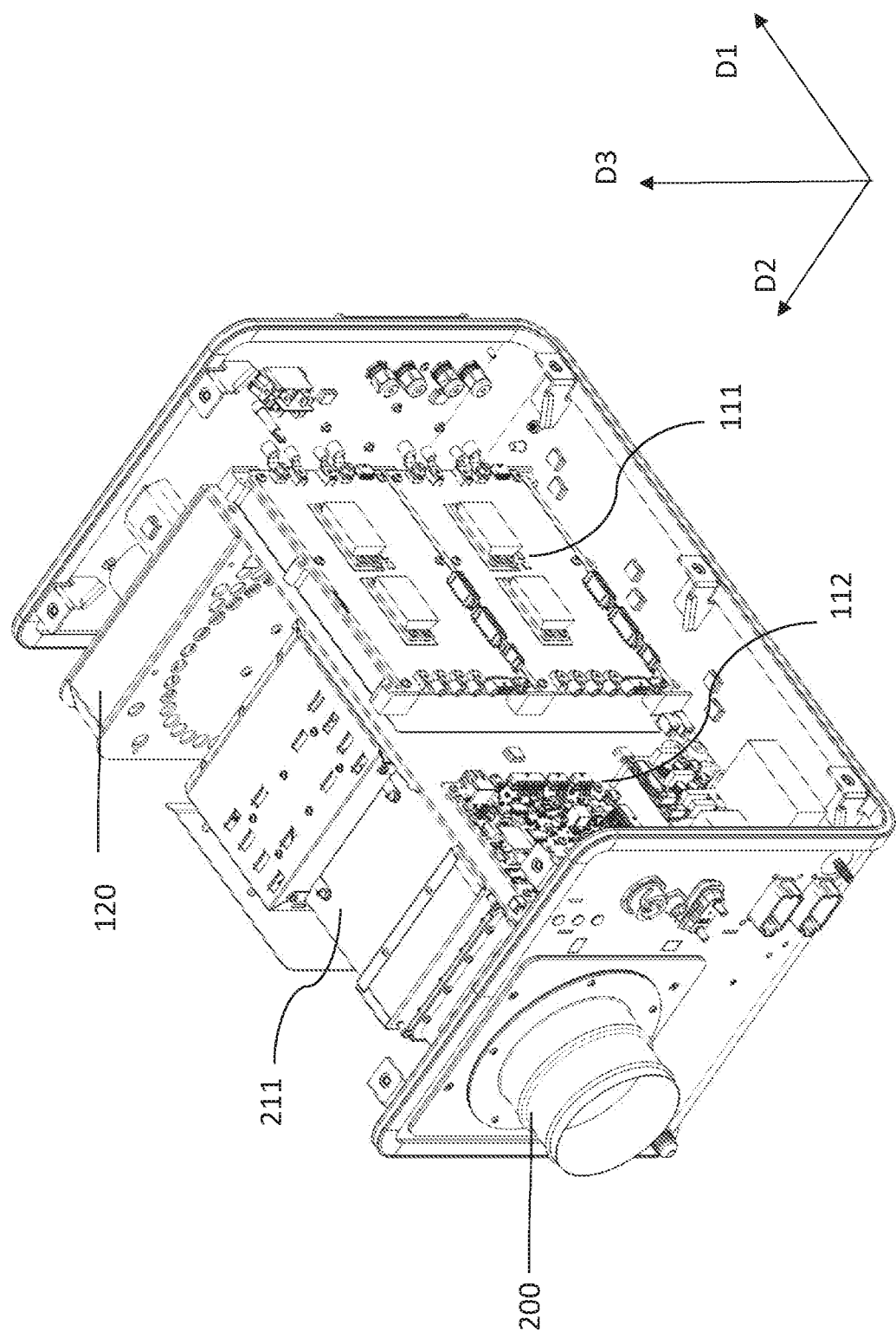
FIG. 4 is a perspective view of the fuel cell system of FIG. 1 when it is seen from a front wall thereof, which illustrates the cold zone in more detail.
Figure 5A:
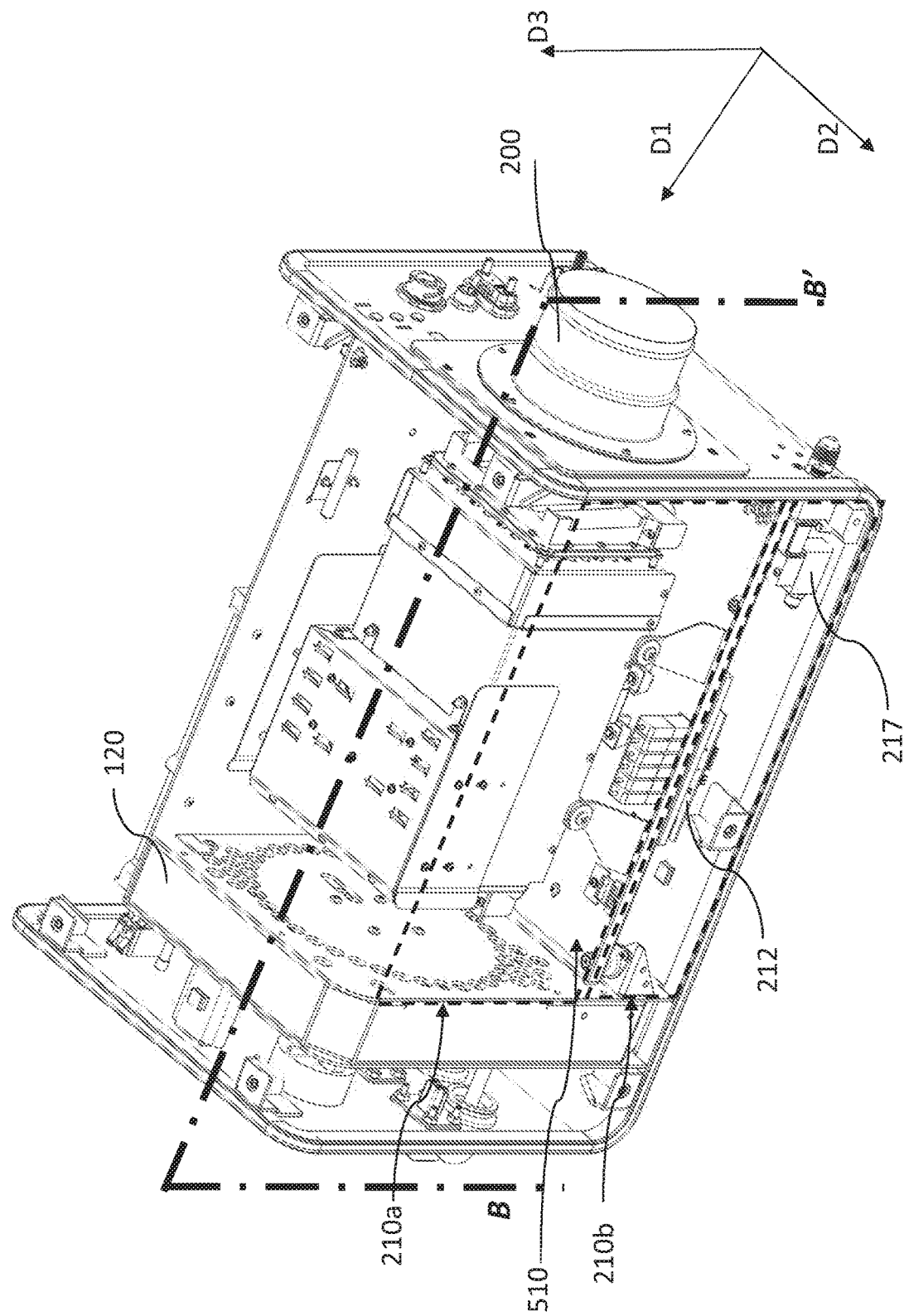
FIG. 5A is a perspective view of the fuel cell system of FIG. 1 when it is seen from a rear wall thereof, which illustrates the hot zone in more detail including two sub-thermal zones.
Figure 5B:
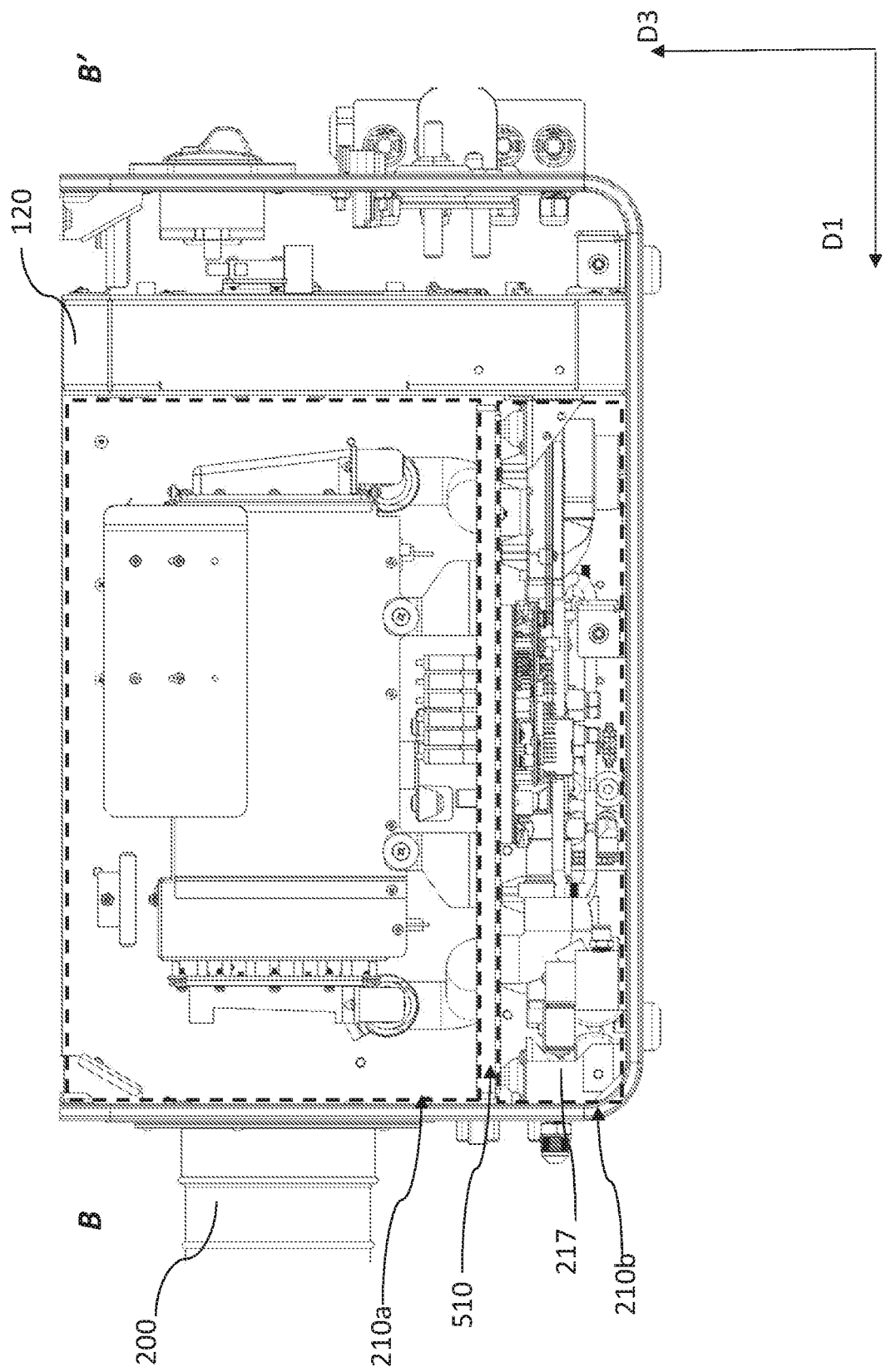
FIG. 5B is a vertical section view of the fuel cell system, when taken along with a plane B-B' of FIG. 5A.

FIG. 4 is a perspective view of the fuel cell system 1 of FIG. 1 when it is seen from a front panel thereof, which illustrates the cold zone (e.g., 110) in more detail. FIG. 5A is a perspective view of the fuel cell system 1 of FIG. 1 when it is seen from a rear wall thereof, which illustrates the hot zone 210 in more detail including two sub-hot zones. FIG. 5B is a vertical section view of the fuel cell system 1, when taken along with a plane B-B' of FIG. 5A.

Referring now to FIGS. 5A and 5B, the hot zone 210 can further be separated into at least two sub-hot zones 210*a* and 210*b* through at least one separation internal wall 510 for providing separate air feedings into the sub-hot zones 210*a* and 210*b* in consideration of different temperature requirements thereon. For example, an air flow stream provided by the air blower 120 may be separated into two air flow streams through the separation wall 510, so one air flow stream may provide air for being mixed with fuel or for fuel dilution, and another air flow stream may be used for maintaining a cooler environment around the BOP components 212 adjacent to the fuel cell stack 211.

During the running of the fuel cell system 1, the temperature of the sub-hot zone 210*a* may be maintained to be higher than the sub-zone 210*b*. For example, the fuel cell stack 211 may require a relatively high operating temperature (e.g., approximately 800° C.~1,200° C.) for a higher energy efficiency while other BOP components such as reactor units or any other heat-radiative member require being maintained to a lower temperature than the temperature of the sub-hot zone 210*a*. Therefore, in one embodiment, the fuel cell stack 211 and some BOP components such as thermistors, thermocouples, switches, and/or the like may be placed in the sub-hot zone 210*a*, and the other BOP components such as CPOX or reactant blowers, fans, fuel control valves, fuel safety shutoff valves, sensors, and/or the like may be placed in the sub-hot zone 210*b*. In some embodiments, control electronics and sensitive electrical components may be placed in the sub-hot zone 210*b*. In one embodiment, the separation wall 510 may be formed of a thermal insulation material, so heat exchange between the sub-hot zones 210*a* and 210*b* can be prevented or reduced.

Thus, the housing box 10 enclosing the fuel cell system 1 may have at least two (e.g., 110 and 210) or three separated thermal zones (e.g., 110, 210a and 210b), and the temperature level of each zone can independently be controlled, thus making it easier to satisfy different temperature requirements given on various types of components of the fuel cell system 1.

Although it is illustrated in FIGS. 5A and 5B that the two sub-hot zones 210a and 210b of the hot zone 210 are separated along the vertical direction D3, exemplary embodiments of the present disclosure are not limited thereto. For example, sub-hot zones of the hot zone 210 can be more than two, and/or the sub-zones can be separated along other directions (e.g., direction D2).

Figure 6A:
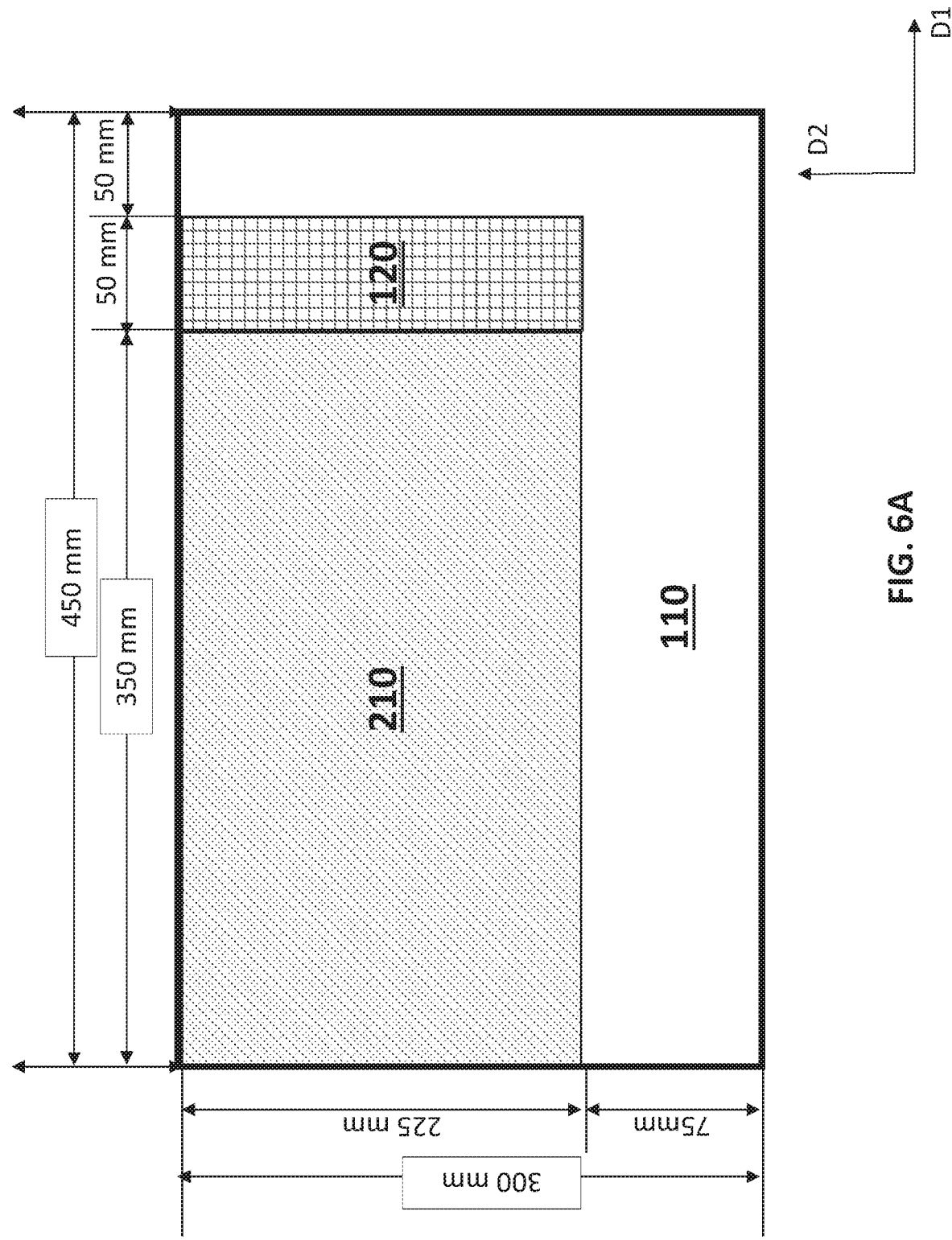
FIG. 6A is an example top view layout of the fuel cell system of FIG. 1 which illustrates dimensions of the cold and hot thermal zones in conjunction with an air blower according to an exemplary embodiment of the present disclosure.
Figure 6B:
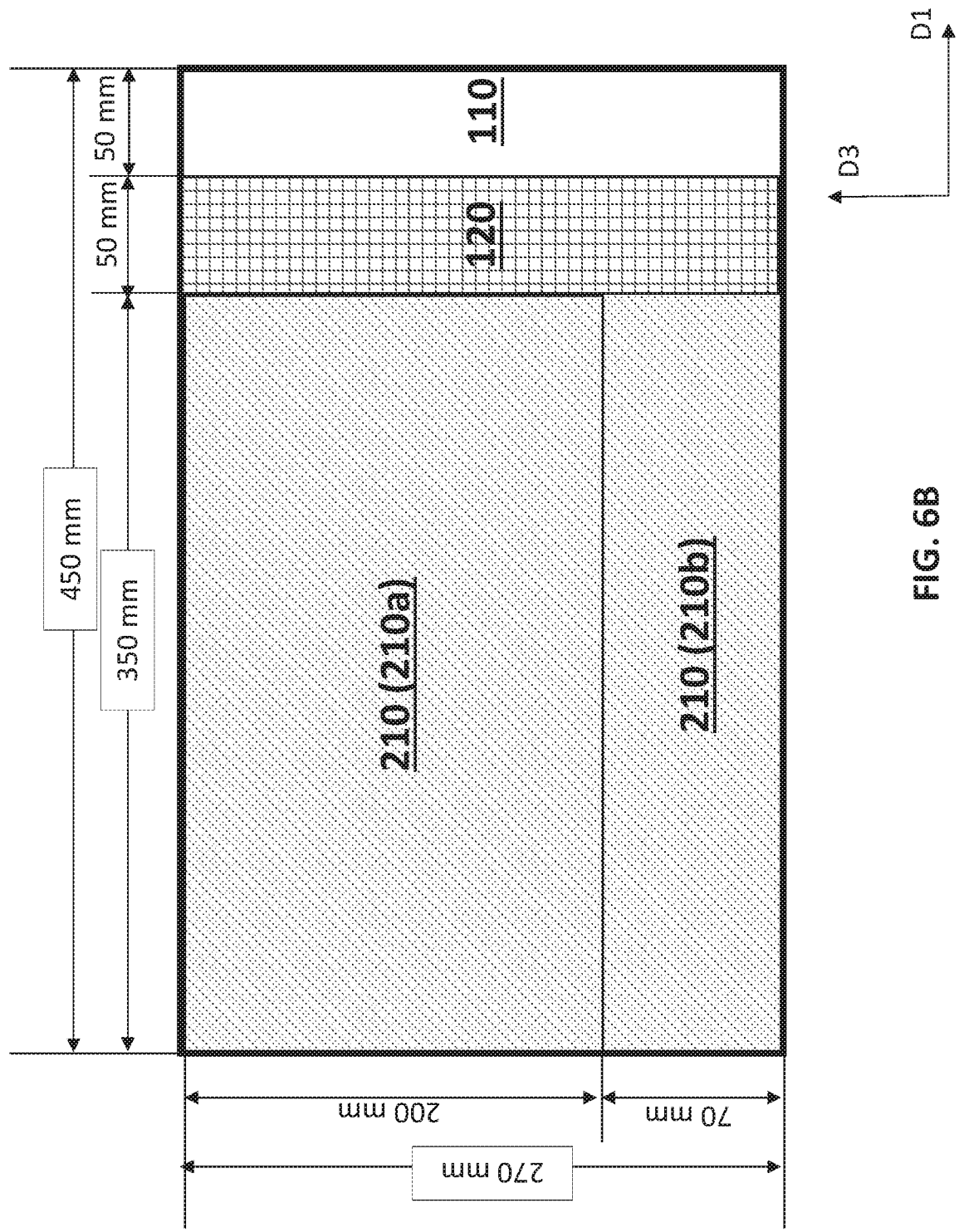
FIG. 6B is an example top view layout of the fuel cell system of FIG. 1 which illustrates dimensions of the sub-thermal zones of the hot thermal zone in conjunction with an air blower according to an exemplary embodiment of the present disclosure.

Referring now to FIGS. 6A and 6B, illustrated are example dimensions of the above three thermal zones (e.g., 110, 210a and 210b) in conjunction with the air blower 120 of the fuel cell system 1 according to an exemplary embodiment of the present disclosure. FIG. 6A illustrates dimensions of the top view layout. As illustrated, the lengths in the directions D2 and D1 of the box 10 are ~300 mm and ~450 mm; e.g., a ratio of the length in the direction D2 to the length in the direction D1 is 1: ~1.5.

In a plane formed by the directions D1 and D2, each of the hot zone 210 and the air blower 120 is formed to be of a quadrilateral shape or approximate thereto, and the cold zone 110a is formed to be of an L-shape.

The rear wall (see the top portion of FIG. 6A) of the box 10 may be divided into the cold zone 110 with a length of ~50 mm, the air blower 120 with a length of ~50 mm and the hot zone 210 with a length of ~350 mm in the direction D1. With respect to the front wall of the box 10 (see the bottom portion of FIG. 6A), the cold zone 110 extends to form an L-shape, the inner surfaces of which have lengths of ~400 mm and ~225 mm, respectively, in the directions D1 and D2. The left side wall may be divided into the cold zone 110 with a length of ~75 mm and the hot zone 210 with of a length of ~225 mm.

FIG. 6B illustrates dimensions of a vertical sectional view layout, when taken along with the line A-A' of FIG. 2A. As illustrated, the upper sub-hot zone 210a and the lower sub-hot zone 210b are formed to have lengths of ~200 mm and ~70 mm, respectively, in the vertical direction D3.

It should be appreciated that the dimensions of the thermal zones 110, 210a and 210b and the air blower 120 described with reference to FIGS. 6A and 6B are only examples, absolute dimensions thereof or relative ratios in volume, area and/or length therebetween can differently be designed according to system's thermal requirements to be controlled to each zone.

Based on the example dimensions illustrated in FIGS. 6A and 6B, volumes for the cold zone 110 and the hot zone 210 can be calculated to be, for example, ~12,150 cm³ and ~21,625 cm³, respectively, so a ratio in volume of the cold zone 110 to the hot zone 210 will be 1: ~1.78. Further, in the hot zone 210, the volumes of the sub-hot zones 210a and 210b will be, for example, 16,018 cm³ and ~5,606 cm³, respectively to give a ratio of the sub-hot zone 210b to the sub-hot zone 210a in volume therebetween will be 1:~2.85.

Figure 7:
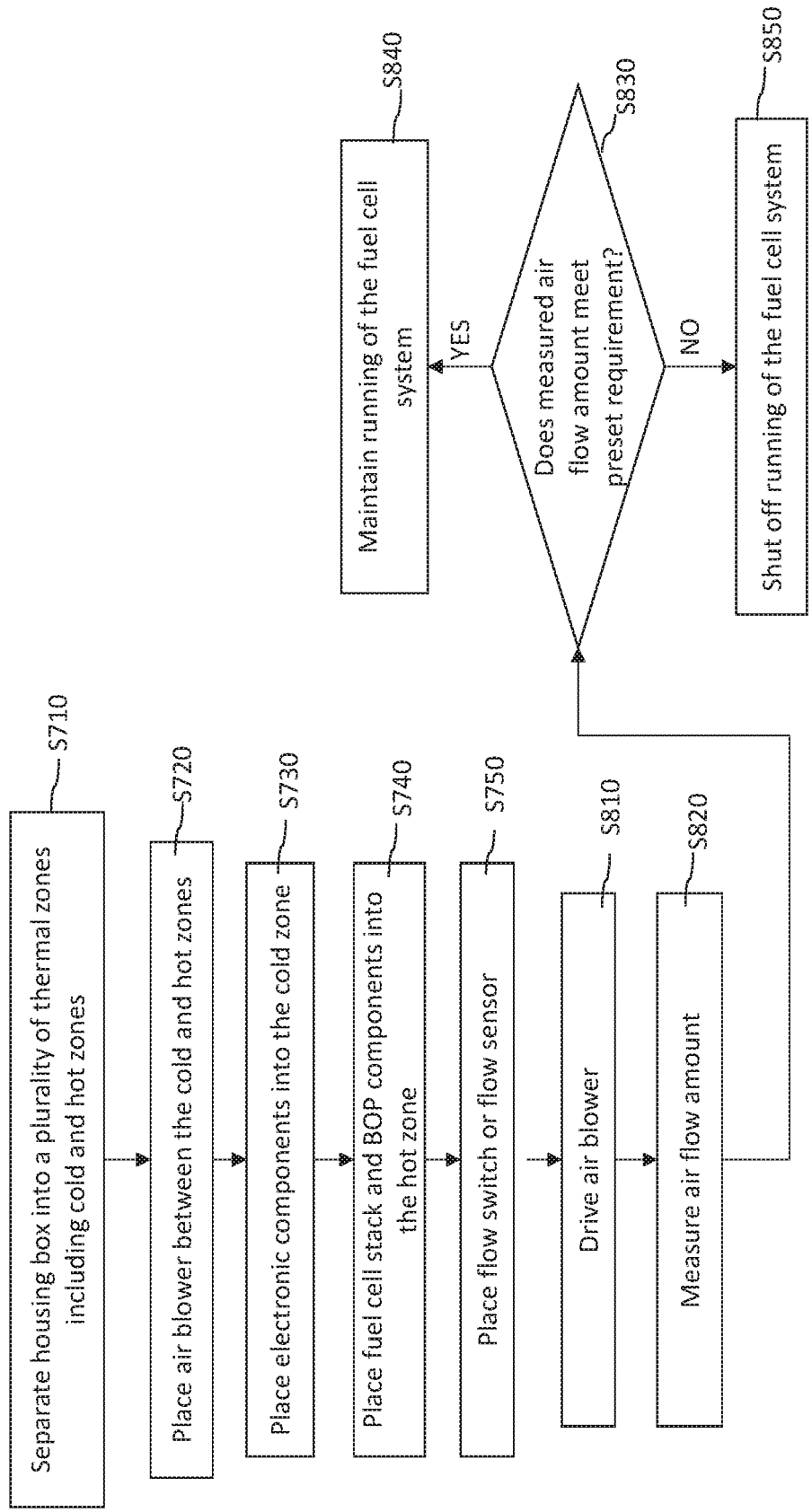
FIG. 7 is a flow chart illustrating a method for providing a forced air flow within a fuel cell system according to an exemplary embodiment of the present disclosure.

FIG. 7 is a flow chart illustrating a method for providing a forced air flow with a fuel cell system and driving the system according to an exemplary embodiment of the present disclosure.

Referring now to FIGS. 1, 2A to 2E, 3A, 3B, 4, 5 and 7, as steps for providing the air flow system, the method may include separating a housing box of a fuel cell system (e.g., 1 of FIG. 1) into at least two thermal zones such as the cold zone (e.g., 110, 110a, 110b1 or 110b2 and the hot zone (e.g., 210) (S710). In one embodiment, the hot zone may further be separated into at least two sub-hot zones (e.g., 210a and 210b of FIG. 5A). The method may further include: placing an air blower (e.g., 120 of FIG. 2A) between the cold and hot zones to provide an air flow across the cold zone and the hot zone (S720); placing electronics (or electrical) components such as power electronics (e.g., 111 of FIG. 2A) and/or any other control or communication-related components (e.g., 112 of FIG. 2A) into the cold zone (S730); and placing one or more fuel cell stacks (e.g., 211 of FIG. 2A) and BOP components (e.g., 213 of FIG. 2A) into the hot zone (S740). In one embodiment, the fuel cell stack may be placed into a sub-hot zone (e.g., 210a of FIG. 5), and the BOP components may be placed into a sub-hot zone (e.g., 210b of FIG. 5). The method may further include placing one or more flow switches (e.g., 113, 113a, 113b, 412 and/or 415 FIGS. 2A, 3A and 3B) or one or more air flow sensors at a location before or in the vicinity of the air blower (S750).

In addition, as steps for driving the fuel cell system, the method may further include: driving the air blower (S810); measuring an air flow amount (or air flow rate or air flow velocity) by the flow switches or the sensors (S820); determining that the measured air flow amount meets a preset air flow requirement (S830); maintaining running of the fuel cell system when the measured air flow amount meets the preset air flow requirement; YES (S840); and shutting off the running of the fuel cell system when the measured air flow amount does not meet the preset requirement; NO (S850). The preset air flow requirement may include that a measured air flow amount is equal to or more than a preset threshold value. The shutting the running of the fuel cell system may include shutting off supply of the fuel by controlling a fuel safety shutoff valve or disconnecting a power connection to the fuel safety shutoff valve.

The present disclosure encompasses embodiments in other specific forms without departing from the spirit or essential characteristics thereof. The foregoing embodiments are therefore to be considered in all respects illustrative rather than limiting on the present disclosure described herein. Scope of the present invention is thus indicated by the appended claims rather than by the foregoing description, and all changes that come within the meaning and range of equivalency of the claims are intended to be embraced therein.

What is claimed is:

1. A housing box enclosing an exothermic apparatus, comprising:
   a first thermal zone connected to an inlet port provided on a first exterior wall of the housing box;
   a second thermal zone connected to an outlet port provided on a second exterior wall of the housing box, the second thermal zone comprising the exothermic apparatus and having a first sub-zone and a second sub-zone, and when the exothermic apparatus is operating, a temperature of the first sub-zone is different than the that of the second-sub zone, the first sub-zone and the second sub-zone being separated by a sub-zone separation wall formed of a thermal insulation material; and
   an air blower is provided between the first and second thermal zones, the air blower being configured to draw in air from the first thermal zone and provide the air to the second thermal zone.

2. The housing box of claim 1, wherein the second thermal zone is gas-flow isolated from the first thermal zone except through the air blower.

3. The housing box of claim 1, wherein a temperature level of the second thermal zone is higher than a temperature level of the first thermal zone when the apparatus and air blower operate.

4. The housing box of claim 1, wherein a pressure level of the second thermal zone is higher than a pressure level of the first thermal zone when the air blower operates.

5. The housing box of claim 1, wherein the inlet port is configured to draw in the air to the first thermal zone from an outside of the housing box, and
wherein the outlet port is configured to exhaust the air from the second thermal zone.

6. The housing box of claim 1, further comprising:
one or more power electronic components provided in the first thermal zone;
and the apparatus comprises one or more fuel-processing components for electric power generation provided in the second thermal zone,
wherein a temperature level of the second thermal zone is higher than a temperature level of the first thermal zone when the air blower and the apparatus operate.

7. The housing box of claim 6, wherein the apparatus comprises a fuel cell system with the one or more fuel-processing components,
wherein the one or more fuel-processing components comprise:
one or more balance-of-plant (BOP) components configured to supply reformate to a fuel cell stack;
the fuel cell stack configured to generate electric power based on the reformate provided from the one or more BOP components.

8. The housing box of claim 7, wherein the one or more BOP components comprise at least one of a fuel reformer, a chemical reactor, a gasket, a pump, a sensor, a humidifier, a heat exchanger, and a burner.

9. A housing box, comprising:
a first thermal zone connected to an inlet port on a first exterior wall of the housing box;
a second thermal zone connected to an outlet port on a second exterior wall of the housing box;
an air blower between the first and second thermal zones, the air blower configured and arranged to draw air from the first thermal zone and provide the air to the second thermal zone; and
the housing box further comprising a flow switch unit configured to: be switched off to shut off operation of the apparatus when an air flow amount measured by the flow switch unit does not meet a preset requirement and to be switched on to maintain the operation of the apparatus when the air flow amount meets the preset requirement.

10. The housing box of claim 9, wherein the flow switch unit comprises at least one of a flapper or a differential pressure switch.

11. The housing box of claim 9, further comprising a separation wall formed of a thermal insulation material separating the second thermal zone into a first sub-zone and a second sub-zones.

12. The housing box of claim 9, wherein the second thermal zone comprises a first sub-zone and a second sub-zone whose temperature level is required to be controlled to be different from the first-sub zone,
wherein the first sub-zone and the second sub-zone are separated by another separation wall formed of a thermal insulation material.

13. The housing box of claim 12, wherein the apparatus comprises a fuel cell system with one or more fuel-processing components,
wherein the one or more fuel-processing components comprise:
one or more BOP components configured to supply reformate to a fuel cell stack; and
the fuel cell stack configured to generate electric power based on the reformate provided from the one or more BOP components, and
wherein the fuel cell stack is provided in the first sub-zone, and the BOP components are provided in the second sub-zone.

14. The housing box of claim 1, wherein the first thermal zone extends in an L-shape from the inlet port to the air blower, and the second thermal zone extends in a straight line from the air blower to the outlet port.

15. The housing box of claim 1, wherein the first exterior wall and the second exterior wall are located on a same plane, and
wherein the first thermal zone extends in an L-shape from the inlet port to the air blower, and the second thermal zone extends in a first direction from the air blower to the outlet port.

16. A housing box, comprising:
a first thermal zone connected to an inlet port on a first exterior wall of the housing box;
a second thermal zone connected to an outlet port on a second exterior wall of the housing box;
an air blower between the first and second thermal zones, the air blower configured to draw air from the first thermal zone and provide the air to the second thermal zone,
wherein the first exterior wall and the second exterior wall are located on a same plane, and the first thermal zone extends in an L-shape from the inlet port to the air blower, and the second thermal zone extends in a first direction from the air blower to the outlet port; and
a third thermal zone is connected to a second inlet port on the first exterior wall,
and the third thermal zone extends in another L-shape from the second inlet port to the air blower.

17. The housing box of claim 16, wherein the second thermal zone is located between the first thermal zone and the third thermal zone.

18. The housing box of claim 13, wherein the BOP components comprise at least one of blowers, fans, fuel control valves, fuel safety shutoff valves and sensors,
wherein the one or more fuel-processing components further comprise:
one or more another BOP components comprising at least one of thermistors, thermocouples and switches, the another BOP components being provided in the first sub-zone.

19. The housing box of claim 12, wherein the apparatus comprises a fuel cell system with one or more fuel-processing components,
wherein the one or more fuel-processing components comprise:
a first group of BOP components comprising at least one of thermistors, thermocouples and switches; and
a second group of BOP components comprising at least one of blowers, fans, fuel control valves, fuel safety shutoff valves and sensors,
wherein the first group of BOP components are provided in the first sub-zone, and the the second group of BOP components are provided in the second sub-zone.

20. The apparatus enclosed by the housing box of claim 1, wherein the inlet port is coupled to an inlet duct extending to an outdoor space through which ambient air is introduced to the first thermal zone.

21. The apparatus enclosed by the housing box of claim 1, wherein the outlet port is coupled to an outlet duct extending to an outdoor space through which the air of the second thermal zone is exhausted.

22. A method for providing an air flow into an apparatus, comprising:
providing a first thermal zone and a second thermal zone within a housing box of the apparatus;
providing an air blower between the first and second thermal zones;
providing one or more power electronics components in the first thermal zone;
providing one or more fuel-processing components adapted to exothermically process a fuel in the second thermal zone;
separating the second thermal zone into at least a first sub-zone and a second sub-zone using a separation wall formed of a thermal insulation material,
operating the second sub-zone at a temperature level different from the temperature level of the first-sub zone.

23. The method of claim 22, wherein the first thermal zone is connected to an inlet port provided on a first exterior wall of the housing box, and the second thermal zone is connected to an outlet port provided on a second exterior wall of the housing box and the air blower draws air into the first thermal zone and blows it into the second thermal zone.

24. The method of claim 22, wherein a temperature level of the second thermal zone is higher than a temperature level of the first thermal zone when the air blower runs and the fuel is processed.

25. The method of claim 22, wherein a pressure level of the second thermal zone is higher than a pressure level of the first thermal zone when the air blower runs.

26. A method for providing an air flow into an apparatus, comprising:
providing a first thermal zone and a second thermal zone within a housing box of the apparatus;
providing an air blower between the first and second thermal zones;
providing one or more power electronics components in the first thermal zone;
providing one or more exothermic fuel-processing components in the second thermal zone
providing a flow switch unit in the apparatus;
shutting off running of the apparatus when air flow amount measured by the flow switch unit does not meet a preset requirement; and
maintaining the running of the apparatus when the air flow amount meets the preset requirement.

27. The method of claim 26, wherein the flow switch unit comprises at least one of a flapper or a differential pressure switch.

28. The method of claim 22, further comprising providing a separation wall formed of a thermal insulation material between the first and second sub-zones.

29. The method of claim 26, further comprising separating the second thermal zone into at least a first sub-zone and a second sub-zone using another separation wall formed of a thermal insulation material,
wherein a temperature level of the second sub-zone required to be controlled is lower from the first-sub zone.

30. The method of claim 22, further comprising:
providing a fuel cell stack of the one or more fuel-processing components in the first sub-zone; and
providing one or more BOP components of the one or more fuel-processing components in the second sub-zone.

31. The method of claim 23, wherein the providing the first thermal zone comprises extending the first thermal zone in an L-shape from the inlet port to the air blower, and wherein the providing the second thermal zone comprises extending the second thermal zone in a straight line from the air blower to the outlet port.

* * * * *